US009852080B2

(12) United States Patent
Hoff et al.

(10) Patent No.: US 9,852,080 B2
(45) Date of Patent: Dec. 26, 2017

(54) EFFICIENTLY GENERATING SELECTION MASKS FOR ROW SELECTIONS WITHIN INDEXED ADDRESS SPACES

(71) Applicant: QUALCOMM Incorporated, San Diego, CA (US)

(72) Inventors: David Paul Hoff, Raleigh, NC (US); Milind Ram Kulkarni, Raleigh, NC (US); Benjamin John Bowers, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/087,077

(22) Filed: Mar. 31, 2016

(65) Prior Publication Data

US 2017/0052900 A1 Feb. 23, 2017

Related U.S. Application Data

(60) Provisional application No. 62/205,974, filed on Aug. 17, 2015.

(51) Int. Cl.
*G06F 12/10* (2016.01)
*G06F 12/0879* (2016.01)
(Continued)

(52) U.S. Cl.
CPC .............. *G06F 12/10* (2013.01); *G06F 1/06* (2013.01); *G06F 12/0879* (2013.01);
(Continued)

(58) Field of Classification Search
CPC .. G06F 12/0879; G06F 12/0895; G06F 12/10; G06F 12/1441; G06F 1/06;
(Continued)

(56) References Cited

U.S. PATENT DOCUMENTS 4,473,878 A 9/1984 Zolnowsky et al.
5,553,229 A 9/1996 Margolin
(Continued)

OTHER PUBLICATIONS

Alsaber, Nabeel et al., "SemCache: Semantics-aware Caching for Efficient GPU Offloading," Proceedings of the 27th International ACM Conference on International Conference on Supercomputing, ICS '13, Jan. 1, 2013, ACM, pp. 421-432.
(Continued)

*Primary Examiner* — Yong Choe
(74) *Attorney, Agent, or Firm* — W&T/Qualcomm

(57) ABSTRACT

Efficiently generating selection masks for row selections within indexed address spaces is disclosed. In this regard, in one aspect, an indexed array circuit is provided, comprising a start indicator that indicates a start indexed array row of a row selection, and an end indicator that indicates an end indexed array row of the row selection. The indexed array circuit further comprises a plurality of indexed array rows ordered in a logical sequence, each comprising a row-level compare circuit. Each row-level compare circuit is configured to generate a selection mask indicator based on a first parallel comparison of subsets of bits of a logical address of the indexed array row with corresponding subsets of bits of the start indicator, and a second parallel comparison of subsets of bits of the logical address of the indexed array row with corresponding subsets of bits of the end indicator.

20 Claims, 14 Drawing Sheets

(51) Int. Cl.
*G06F 12/0895* (2016.01)
*G06F 1/06* (2006.01)
*G06F 12/14* (2006.01)
*G06F 12/1027* (2016.01)

(52) U.S. Cl.
CPC ...... *G06F 12/0895* (2013.01); *G06F 12/1027* (2013.01); *G06F 12/1441* (2013.01); *G06F 2212/1016* (2013.01); *G06F 2212/1041* (2013.01); *G06F 2212/65* (2013.01)

(58) Field of Classification Search
CPC ..... G06F 2212/1016; G06F 2212/1041; G06F 2212/65
See application file for complete search history.

(56) References Cited

U.S. PATENT DOCUMENTS

| | | |
|---|---|---|
| 5,600,847 A | 2/1997 | Guttag et al. |
| 6,047,352 A | 4/2000 | Lakhani et al. |
| 7,523,189 B2 | 4/2009 | Boylan et al. |
| 7,822,947 B2 | 10/2010 | Ford et al. |
| 7,983,108 B2 | 7/2011 | Manning |

OTHER PUBLICATIONS

Tiwari, Mohit et al., "A Small Cache of Large Ranges: Hardware Methods for Efficiently Searching, Storing, and Updating Big Dataflow Tags," MICRO 41, Proceedings of the 41st Annual IEEE/ACM International Symposium on Microarchitecture, Nov. 8-12, 2008, IEEE Computer Society, pp. 94-105.

International Search Report and Written Opinion for PCT/US2016/044433, dated Oct. 7, 2016, 14 pages.

International Preliminary Report on Patentability for PCT/US2016/044433, dated Aug. 23, 2017, 25 pages.

FIG. 4A

EXEMPLARY PARALLEL COMPARE LOGIC FOR LOGICAL ADDRESS "9" (xb 0 001 001) — 400

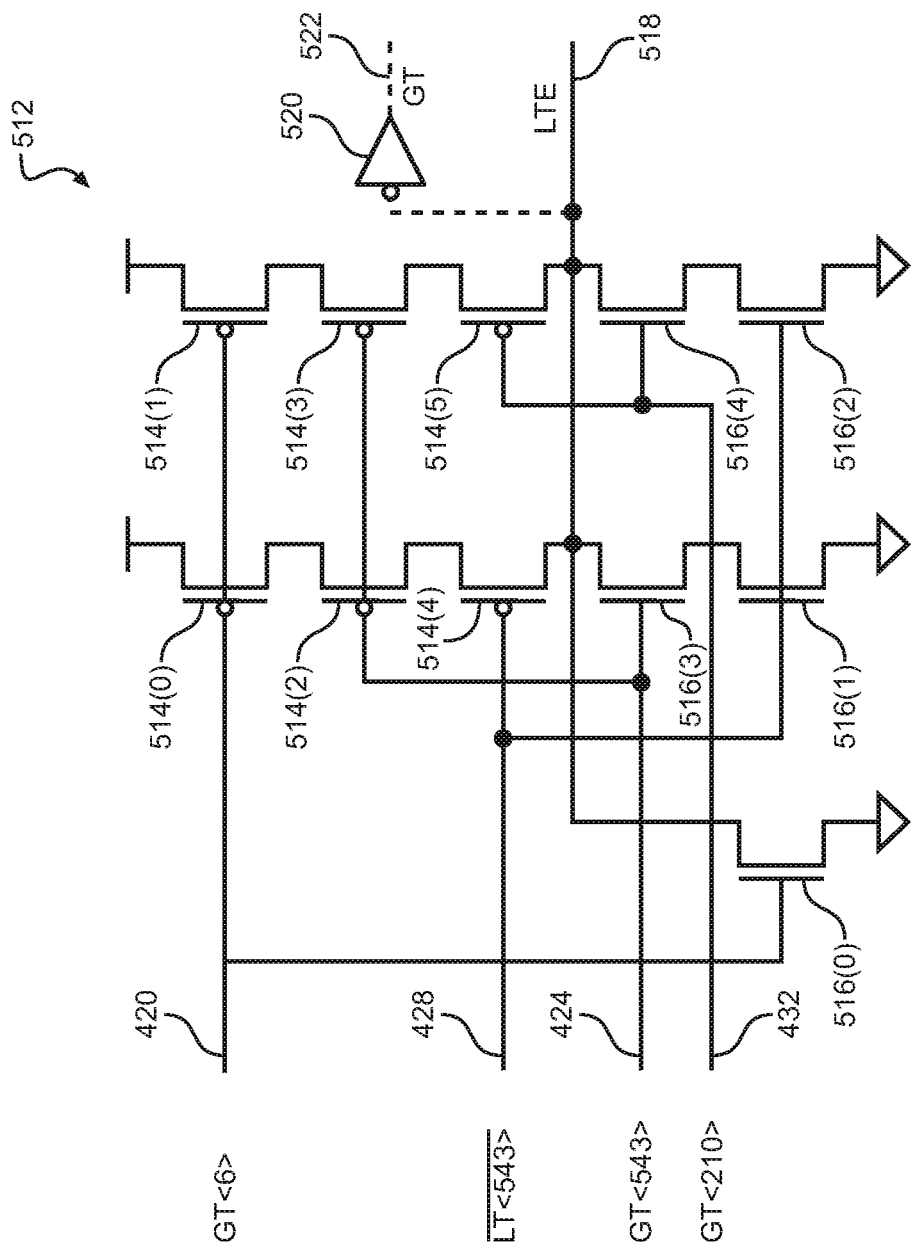

EFFICIENTLY GENERATING SELECTION MASKS FOR ROW SELECTIONS WITHIN INDEXED ADDRESS SPACES

PRIORITY APPLICATION

The present application claims priority under 35 U.S.C. §119(e) to U.S. Provisional Patent Application Ser. No. 62/205,974 filed on Aug. 17, 2015, and entitled "EFFICIENTLY GENERATING SELECTION MASKS FOR MULTIPLE ROW SELECTIONS WITHIN INDEXED ADDRESS SPACES," which is incorporated herein by reference in its entirety.

BACKGROUND

I. Field of the Disclosure

The technology of the disclosure relates generally to operations within computer processors for selecting rows within indexed address spaces.

II. Background

Many operations carried out by conventional computer processors and their constituent subsystems involve the selection of multiple rows in an indexed address space. For instance, such conventional computer processors may include indexed arrays, made up of indexed array rows arranged in a logical sequence, for use in operations such as tracking register assignments, issued instructions, and/or committed instructions, as non-limiting examples. In particular, some operations may require the simultaneous selection of an arbitrary, logically contiguous range of indexed array rows from an indexed array or other indexed address space within a single processor clock cycle. The row selection may comprise none of the indexed array rows, all of the indexed array rows, or any logically contiguous subset of the indexed array rows. As an additional complication, in some aspects, consecutive row selections may be independent of each other, such that a particular row selection may have no relation to previous or subsequent row selections.

In conventional computer processors, providing such arbitrary row selection within an indexed address space may require a significant number of calculations and comparisons. Because each row selection is independent of previous or subsequent row selections, it may not be feasible to perform cumulative tracking of logical address selections to determine a next row selection. Moreover, a given row selection within an indexed address space may require comparison of a logical address of every indexed array row within the indexed address space with a desired row selection to determine whether each indexed array row falls within the desired row selection. Mechanisms for carrying out such comparisons may prove to be prohibitively expensive in terms of processor performance, chip area, and power consumption.

Accordingly, it is desirable to provide a mechanism for efficiently selecting an arbitrary and potentially large number of rows within an indexed address space.

SUMMARY OF THE DISCLOSURE

Aspects disclosed in the detailed description include efficiently generating selection masks for row selections within indexed address spaces. In this regard, in one aspect, an indexed array circuit is provided. The indexed array circuit provides a plurality of indexed array rows that are ordered in a logical sequence. The indexed array circuit includes a start indicator that indicates a start indexed array row of a row selection within the plurality of indexed array rows, and an end indicator that indicates an end indexed array row of the row selection within the plurality of indexed array rows. In some aspects, the start indicator and the end indicator may comprise pointers to indexed array rows within the indexed array circuit, as a non-limiting example. Each indexed array row of the plurality of indexed array rows includes a row-level compare circuit that is configured to generate a selection mask indicator that indicates whether the indexed array row is a member of the row selection indicated by the start indicator and the end indicator. The row-level compare circuit is configured to generate the selection mask indicator by performing parallel comparisons of subsets of bits of a logical address of the indexed array row with corresponding subsets of bits of the start indicator, and by performing parallel comparisons of the subsets of bits of the logical address of the indexed array row with corresponding subsets of bits of the end indicator. The generated selection mask indicators may then be aggregated into a selection mask.

In some aspects in which the logical address of the indexed array row comprises seven (7) bits, the row-level compare circuit may generate the selection mask indicator based on a comparison of bit six (6) of the logical address and each of the start indicator and the end indicator, a comparison of bits five (5), four (4), and three (3) of the logical address and each of the start indicator and the end indicator, and/or a comparison of bits two (2), one (1), and zero (0) of the logical address and each of the start indicator and the end indicator. Each row-level compare circuit provides custom comparison logic based on the logical address of the corresponding indexed array row and all possible combinations of values for the start indicator and the end indicator. In this manner, generation of the selection mask may be parallelized for high performance, and may be regular and efficient in structure to minimize signaling and avoid routing congestion. In addition, exemplary aspects may accommodate non-sequential ordering of array rows, and may be portable to enable re-use in many applications.

In another aspect, an indexed array circuit for efficiently generating selection masks for row selections within an indexed address space is provided. The indexed array circuit comprises a plurality of indexed array rows ordered in a logical sequence, with each indexed array row of the plurality of indexed array rows comprising a logical address and a row-level compare circuit. The indexed array circuit further comprises a start indicator that indicates a start indexed array row of a row selection within the plurality of indexed array rows. The indexed array circuit also comprises an end indicator that indicates an end indexed array row of the row selection within the plurality of indexed array rows. Each of the row-level compare circuits of the plurality of indexed array rows is configured to perform a first plurality of parallel comparisons of a plurality of subsets of bits of the logical address of the indexed array row with a corresponding plurality of subsets of bits of the start indicator. Each of the row-level compare circuits of the plurality of indexed array rows is further configured to perform a second plurality of parallel comparisons of the plurality of subsets of bits of the logical address of the indexed array row with a corresponding plurality of subsets of bits of the end indicator. Each of the row-level compare circuits of the plurality of indexed array rows is also configured to generate a selection mask indicator that indicates whether the corresponding indexed array row is within the row selection, based on the first plurality of parallel comparisons and the second plurality of parallel comparisons. The indexed array circuit is configured to aggregate the plurality of generated selection mask indicators into a selection mask.

In another aspect, an indexed array circuit for efficiently generating selection masks for row selections within an indexed address space is provided. The indexed array circuit comprises a means for performing, for each indexed array row of a plurality of indexed array rows ordered in a logical sequence, a first plurality of parallel comparisons of a plurality of subsets of bits of a logical address of the indexed array row with a corresponding plurality of subsets of bits of a start indicator that indicates a start indexed array row of a row selection within the plurality of indexed array rows. The indexed array circuit further comprises a means for performing, for each indexed array row of the plurality of indexed array rows ordered in the logical sequence, a second plurality of parallel comparisons of the plurality of subsets of bits of the logical address of the indexed array row with a corresponding plurality of subsets of bits of an end indicator that indicates an end indexed array row of the row selection within the plurality of indexed array rows. The indexed array circuit also comprises a means for generating, for each indexed array row of the plurality of indexed array rows ordered in the logical sequence, a selection mask indicator that indicates whether the indexed array row is within the row selection, based on the first plurality of parallel comparisons and the second plurality of parallel comparisons. The indexed array circuit additionally comprises a means for aggregating the plurality of generated selection mask indicators into a selection mask.

In another aspect, a method for efficiently generating selection masks for row selections within an indexed address space is provided. The method comprises performing, by a row-level compare circuit of an indexed array circuit, for each indexed array row of a plurality of indexed array rows ordered in a logical sequence, a first plurality of parallel comparisons of a plurality of subsets of bits of a logical address of the indexed array row with a corresponding plurality of subsets of bits of a start indicator that indicates a start indexed array row of a row selection within the plurality of indexed array rows. The method further comprises performing, by the row-level compare circuit of the indexed array circuit, for each indexed array row of the plurality of indexed array rows ordered in the logical sequence, a second plurality of parallel comparisons of the plurality of subsets of bits of the logical address of the indexed array row with a corresponding plurality of subsets of bits of an end indicator that indicates an end indexed array row of the row selection within the plurality of indexed array rows. The method also comprises generating, by the row-level compare circuit of the indexed array circuit, for each indexed array row of the plurality of indexed array rows ordered in the logical sequence, a selection mask indicator that indicates whether the corresponding indexed array row is within the row selection, based on the first plurality of parallel comparisons and the second plurality of parallel comparisons. The method additionally comprises aggregating, by the indexed array circuit, the plurality of generated selection mask indicators into a selection mask.

BRIEF DESCRIPTION OF THE FIGURES

FIGS. 4A and 4B are diagrams illustrating an exemplary parallel compare logic chart and a logical diagram for generating a selection mask indicator, respectively, for an indexed array row having a logical address of nine (9) within the indexed array circuit of FIG. 1;

FIGS. 5A and 5B are diagrams illustrating an exemplary comparison merging logic chart and a merge circuit diagram for generating the selection mask indicator, respectively, for an indexed array row having a logical address of nine (9) within the indexed array circuit of FIG. 1;

DETAILED DESCRIPTION

Figure 1:
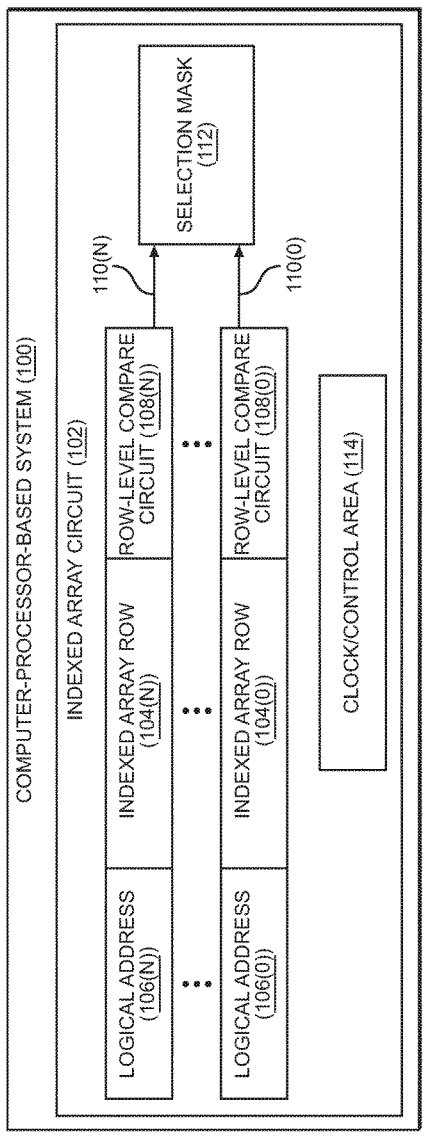
FIG. 1 is a block diagram illustrating a computer processor providing an indexed array circuit comprising a plurality of indexed array rows, each providing a row-level compare circuit for generating a selection mask.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include efficiently generating selection masks for row selections within indexed address spaces. In this regard, FIG. 1 illustrates a computer-processor-based system 100 including an exemplary indexed array circuit 102 that provides a plurality of indexed array rows 104(0)-104(N). In some aspects, the indexed array circuit 102 may be implemented as a memory buffer within the computer-processor-based system 100. The indexed array rows 104(0)-104(N) are ordered in a logical sequence, and are each uniquely identified by and accessed via a corresponding logical address 106(0)-106(N). Each of the indexed array rows 104(0)-104(N) is also associated with a corresponding row-level compare circuit 108(0)-108(N).

To facilitate the selection of the indexed array rows 104(0)-104(N), each of the row-level compare circuits 108(0)-108(N) is configured to generate a respective selection mask indicator 110(0)-110(N) to indicate whether the associated indexed array row 104(0)-104(N) is to be included within a row selection of the indexed array rows 104(0)-104(N). As discussed in greater detail below, each of the row-level compare circuits 108(0)-108(N) provides custom logic, specific to the corresponding indexed array row 104(0)-104(N), for providing comparisons between the logical address 106(0)-106(N) of the corresponding indexed array row 104(0)-104(N) and both the value of a start indicator (not shown) indicating a start of a row selection, and the value of an end indicator (not shown) indicating an end of the row selection. Based on these comparisons, the selection mask indicators 110(0)-110(N) are generated. The selection mask indicators 110(0)-110(N) are then aggregated by the indexed array circuit 102 into a selection mask 112.

In some aspects, the indexed array circuit 102 may also provide a clock/control area 114. The clock/control area 114 may be configured to provide functionality such as generation of clock signals and/or control signals, as non-limiting examples. In some aspects of the indexed array circuit 102, the functionality for generating the selection mask indicators 110(0)-110(N) may be distributed between the row-level compare circuits 108(0)-108(N) and the clock/control area 114 of the indexed array circuit 102.

Figure 2A:
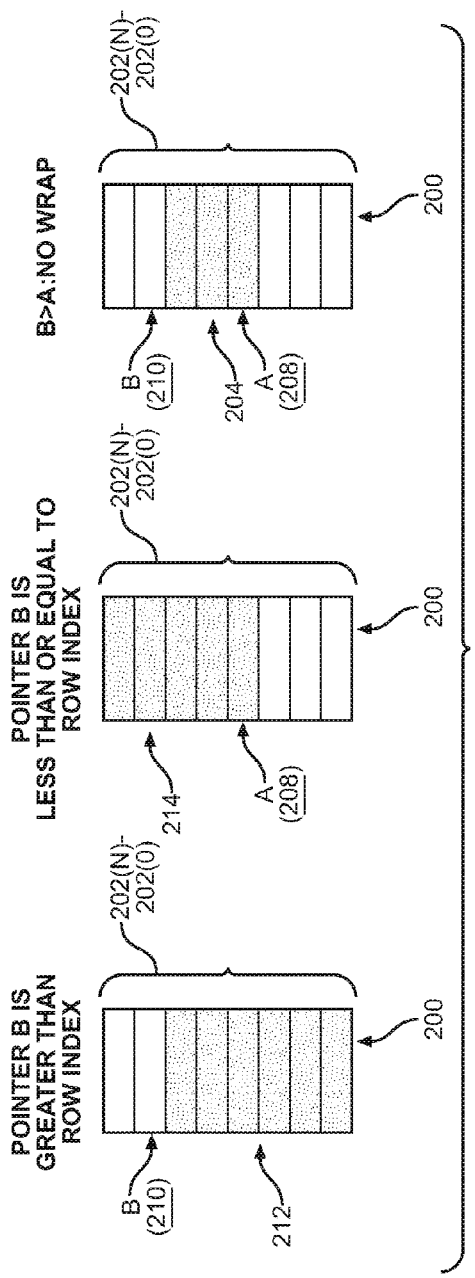
FIGS. 2A and 2B are block diagrams illustrating exemplary determinations of row selections within the indexed array circuit of FIG. 1.
Figure 2B:
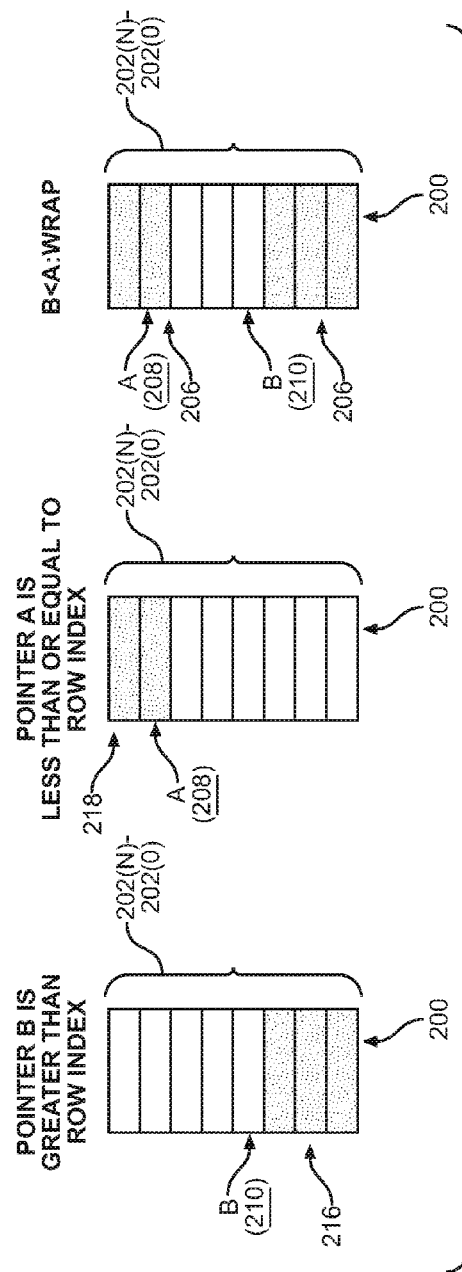

Before discussing operations of the row-level compare circuits 108(0)-108(N) for generating the selection mask indicators 110(0)-110(N) in greater detail below, exemplary determinations of row selections within the indexed array circuit 102 of FIG. 1 are described. In this regard, FIGS. 2A and 2B are provided. In FIGS. 2A and 2B, an indexed array 200 is shown. The indexed array 200 comprises a plurality of indexed array rows 202(0)-202(N) ordered in a logical sequence, and is understood to correspond to the indexed array circuit 102 of FIG. 1 in functionality. Row selections 204 and 206 within the indexed array 200, as shown in FIGS. 2A and 2B, respectively, are each bounded by a start indicator 208 (also referred to herein as "A") and an end indicator 210 (also referred to herein as "B").

In FIG. 2A, the row selection 204 represents a "no wrap" scenario, in which the start indicator 208 points to an indexed array row 202(0)-202(N) having a logical address that is less than a logical address of an indexed array row 202(0)-202(N) pointed to by the end indicator 210. In contrast, the row selection 206 of FIG. 2B represents a "wrap" scenario, in which the start indicator 208 points to an indexed array row 202(0)-202(N) having a logical address that is greater than a logical address of an indexed array row 202(0)-202(N) pointed to by the end indicator 210. Thus, in FIG. 2B, the row selection 206 is understood to conceptually "wrap" from the top of the indexed array 200 around to the bottom. In some aspects, each of the start indicator 208 and the end indicator 210 comprises a pointer. Some aspects may provide that the start indicator 208 and the end indicator 210 are provided as inputs to a row-level compare circuit (not shown) of each of the indexed array rows 202(0)-202(N).

To determine the row selections 204 and 206, the row-level compare circuit for each of the indexed array rows 202(0)-202(N) performs two (2) comparisons relative to a logical address 0-N (e.g., one of the logical addresses 104(0)-104(N) of FIG. 1) of each of the indexed array rows 202(0)-202(N): whether the start indicator 208 is less than or equal to the logical address, and whether the end indicator 210 is greater than the logical address. For example, in FIG. 2A, a shaded portion 212 of the indexed array 200 indicates the indexed array rows 202(0)-202(N) for which the end indicator 210 is greater than the logical address, and a shaded portion 214 of the indexed array 200 indicates the indexed array rows 202(0)-202(N) for which the start indicator 208 is less than or equal to the logical address. Similarly, in FIG. 2B (in which the start indicator 208 and the end indicator 210 have been switched for the sake of illustration), a shaded portion 216 indicates the indexed array rows 202(0)-202(N) for which the end indicator 210 is greater than the logical address, and a shaded portion 218 indicates the indexed array rows 202(0)-202(N) for which the start indicator 208 is less than or equal to the logical address.

The results of these comparisons are then merged to determine the row selections 204 and 206 indicated by the start indicator 208 and the end indicator 210. In the "no wrap" scenario illustrated in FIG. 2A, the end indicator 210 is determined to be greater than the start indicator 208 (i.e., the end indicator 210 points to an indexed array row 202(0)-202(N) having a logical address that is greater than a logical address of an indexed array row 202(0)-202(N) pointed to by the start indicator 208). Thus, the row selection 204 includes the indexed array rows 202(0)-202(N) for which the start indicator 208 is less than or equal to the corresponding logical address, and the end indicator 210 is greater than the logical address. In the "wrap" scenario shown in FIG. 2B, the end indicator 210 is not greater than the start indicator 208 (i.e., the start indicator 208 points to an indexed array row 202(0)-202(N) having a logical address that is greater than a logical address of an indexed array row 202(0)-202(N) pointed to by the end indicator 210). Accordingly, the row selection 206 includes the indexed array rows 202(0)-202(N) for which the start indicator 208 is less than or equal to the corresponding logical address, or the end indicator 210 is greater than the logical address.

Figure 3A:
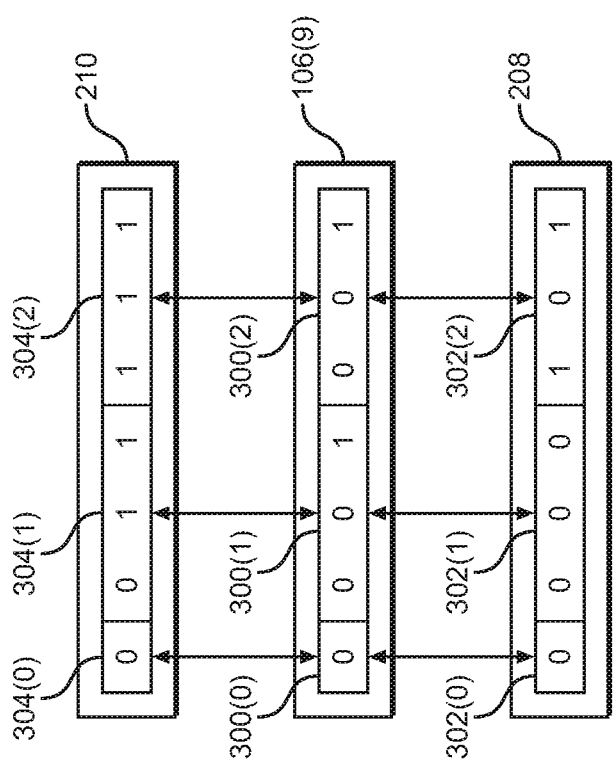
FIGS. 3A and 3B are diagrams illustrating an exemplary comparison of subsets of bits for a logical address of an indexed array row with those of a start indicator and an end indicator, and the rules by which such comparisons may be performed.
Figure 3B:
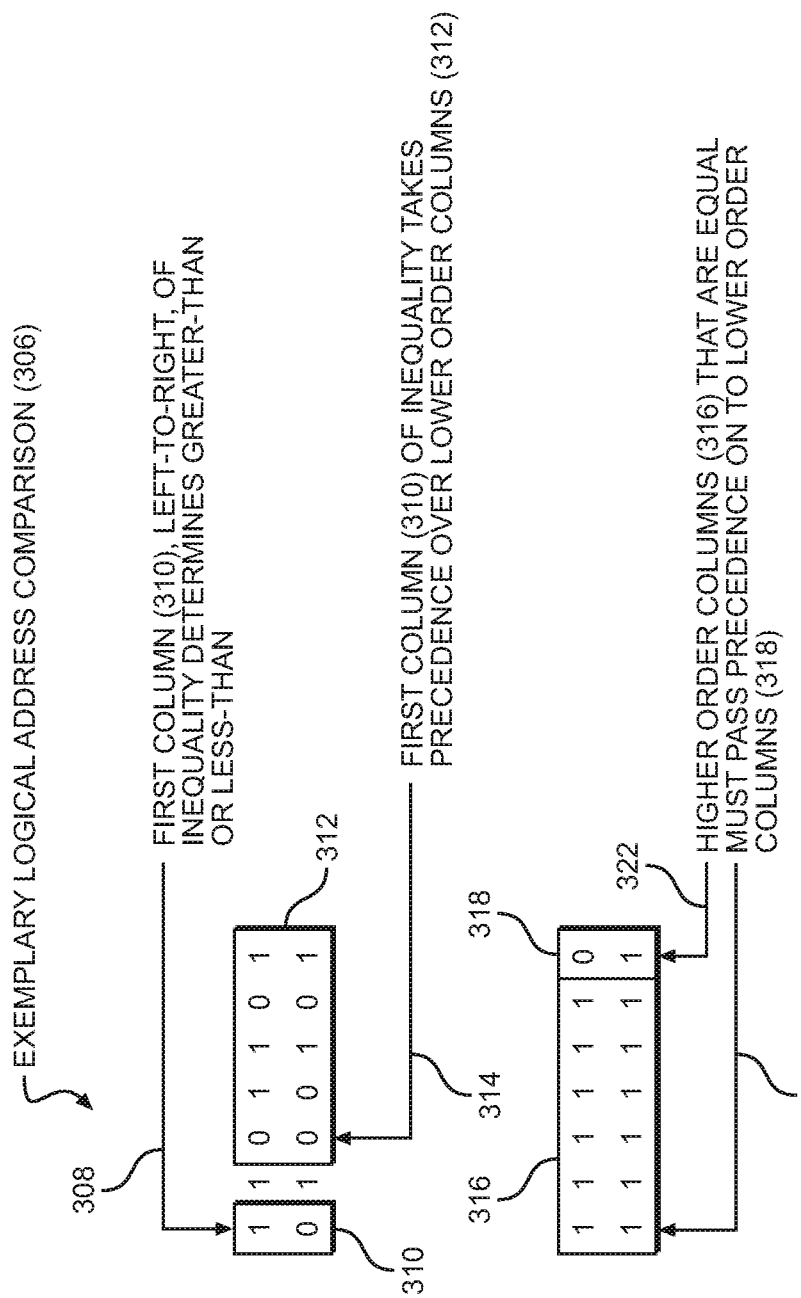

To achieve greater efficiency, the comparisons illustrated in FIGS. 2A and 2B for determining whether the start indicator 208 is less than or equal to the logical address and whether the end indicator 210 is greater than the logical address may be performed by the row-level compare circuits 108(0)-108(N) of FIG. 1 using parallel comparisons of subsets of bits of the logical address and each of the start indicator 208 and the end indicator 210. To illustrate exemplary comparisons of subsets of bits and the rules by which such comparisons may be performed, FIGS. 3A and 3B are provided. FIG. 3A illustrates an aspect in which three (3) subsets of bits of a seven (7)-bit logical address 106(9) are compared with the corresponding subsets of bits of the start indicator 208 and the end indicator 210. FIG. 3B illustrates rules underlying an exemplary logical address comparison that may be performed by the row-level compare circuits 108(0)-108(N) of FIG. 1 for generating the selection mask indicators 110(0)-110(N).

In FIG. 3A, the logical address 106(9), corresponding to the indexed array row 104(9) of the plurality of indexed array rows 104(0)-104(N) of FIG. 1, is shown. As seen in FIG. 3A, the logical address 106(9) has a seven (7)-bit binary value of 0001001, which corresponds to a decimal value of nine (9). FIG. 3A also shows the start indicator 208 and the end indicator 210 of FIGS. 2A and 2B. The start indicator 208 in this example has a binary value of 0000101, corresponding to a decimal value of five (5). The end indicator 210 in this example has a binary value of 0011111, which corresponds to a decimal value of 15. It is to be understood that the size and values of the logical address 106(9), the start indicator 208, and the end indicator 210 in FIG. 3A are non-limiting examples, and that the size and values of the logical address 106(9), the start indicator 208, and the end indicator 210 in other aspects may vary from what is illustrated here.

The logical address 106(9) in FIG. 3A is divided into three (3) subsets 300(0)-300(2) of bits. Subset 300(0) includes bit six (6) of the logical address 106(9), while subset 300(1) includes bits five (5), four (4), and three (3) of the logical address 106(9), and subset 300(2) includes bits two (2), one (1), and zero (0) of the logical address 106(9). The start indicator 208 and the end indicator 210 are similarly divided into subsets 302(0)-302(2) and 304(0)-304(2), respectively. The subsets 302(0)-302(2) and 304(0)-304(2) partition the start indicator 208 and the end indicator 210, respectively, in a manner corresponding to the subsets 300(0)-300(2) of the logical address 106(9).

When comparing the logical address 106(9) with the start indicator 208, the row-level compare circuit 108(9) associated with the indexed array row 104(9) may perform parallel comparisons of the subset 300(0) with the subset 302(0), the subset 300(1) with the subset 302(1), and/or the subset 300(2) with the subset 302(2). Likewise, when comparing the logical address 106(9) with the end indicator 210, the row-level compare circuit 108(9) associated with the indexed array row 104(9) may perform parallel comparisons of the subset 300(0) with the subset 304(0), the subset 300(1) with the subset 304(1), and/or the subset 300(2) with the subset 304(2). The rules by which such comparisons are made are discussed in greater detail with respect to FIG. 3B.

To perform the parallel comparisons of subsets, such as the subsets 300(0)-300(2), 302(0)-302(2), 304(0)-304(2), each of the row-level compare circuits 108(0)-108(N) of FIG. 1 implements custom logic providing a comparison between the logical address 106(0)-106(N) of the indexed array row 104(0)-104(N) corresponding to the row-level compare circuit 108(0)-108(N) and the value of the start indicator 208 and the end indicator 210 of FIGS. 2A and 2B. Consequently, the specific structure of each of the row-level compare circuits 108(0)-108(N) may vary from others of the row-level compare circuits 108(0)-108(N). As described in greater detail below with respect to FIGS. 4A and 4B, the custom logic provided by each of the row-level compare circuits 108(0)-108(N) is based on pre-calculated results of comparing the logical address 106(0)-106(N) of the corresponding indexed array row 104(0)-104(N) with all possible combinations of values for the start indicator 208 and the end indicator 210. Note that, in aspects such as the example of FIG. 3A, the compare logic used for comparisons of the subsets 300(2), 302(2), 304(2) repeat every eight (8) of the indexed array rows 104(0)-104(N). Similarly, the compare logic used for comparisons of the subsets 300(1), 302(1), 304(1) are the same over sets (or "sub-banks") of eight (8) indexed array rows 104(0)-104(N).

Referring now to FIG. 3B, rules governing an exemplary logical address comparison 306 that may be performed by the row-level compare circuits 108(0)-108(N) of FIG. 1 for generating the selection mask indicators 110(0)-110(N) are illustrated. As indicated by arrow 308, the logic employed by the row-level compare circuits 108(0)-108(N) is based on a rule that, when comparing a row selection indicator (such as the start indicator 208 and/or the end indicator 210 of FIGS. 2A and 2B) to a logical address (such as the logical address 106(9)), a first column 310 (counting from left to right) of inequality determines whether the row selection indicator is greater than or less than the logical address. Moreover, where the inequality is reversed in lower order columns 312, the first column 310 of inequality takes precedence, as indicated by arrow 314. Where higher order columns 316 are equal, precedence is passed on to lower order columns 318 until an inequality (if any exists) is identified, as indicated by arrows 310 and 322.

Figure 4A:
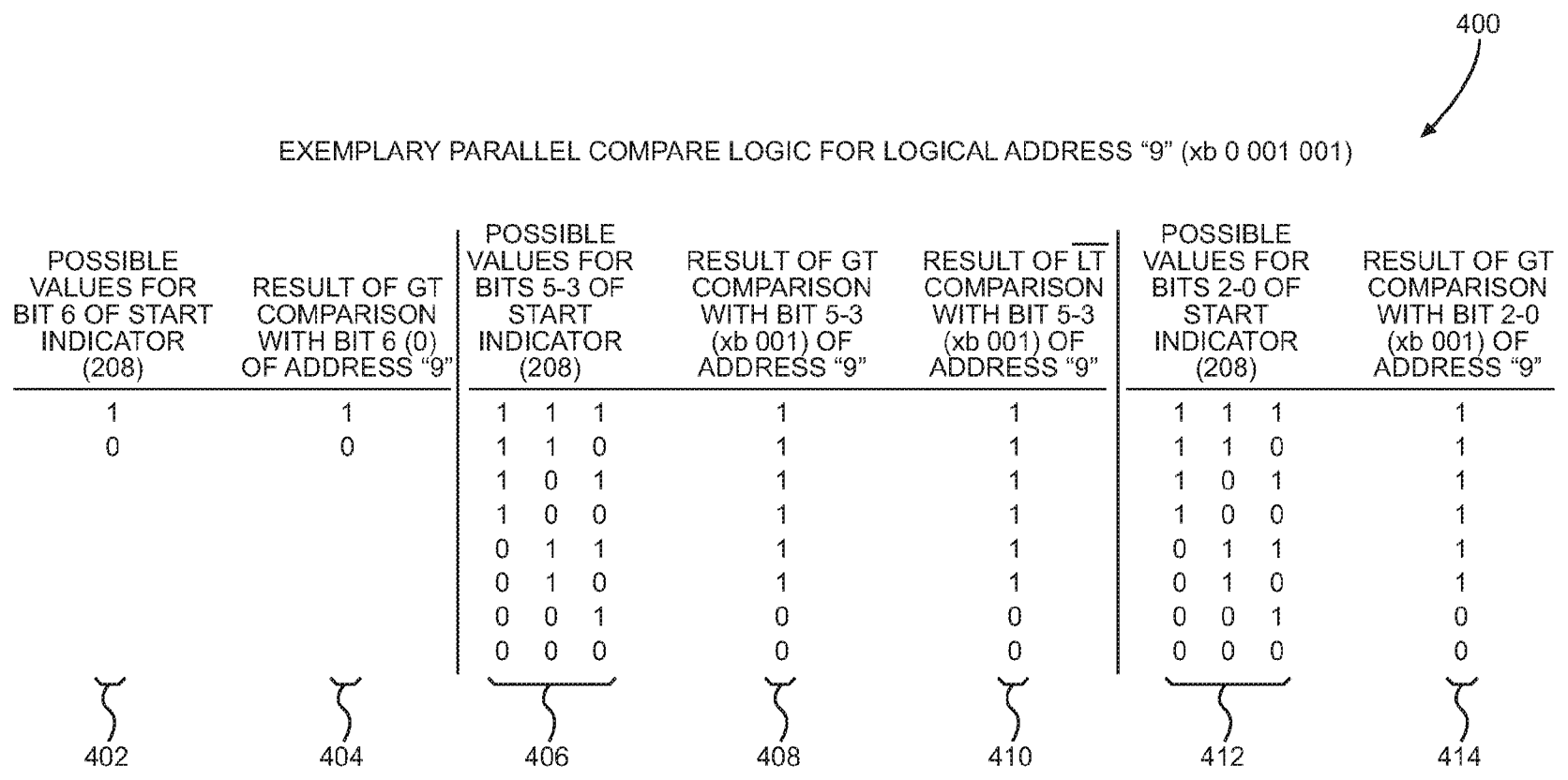
Figure 4B:
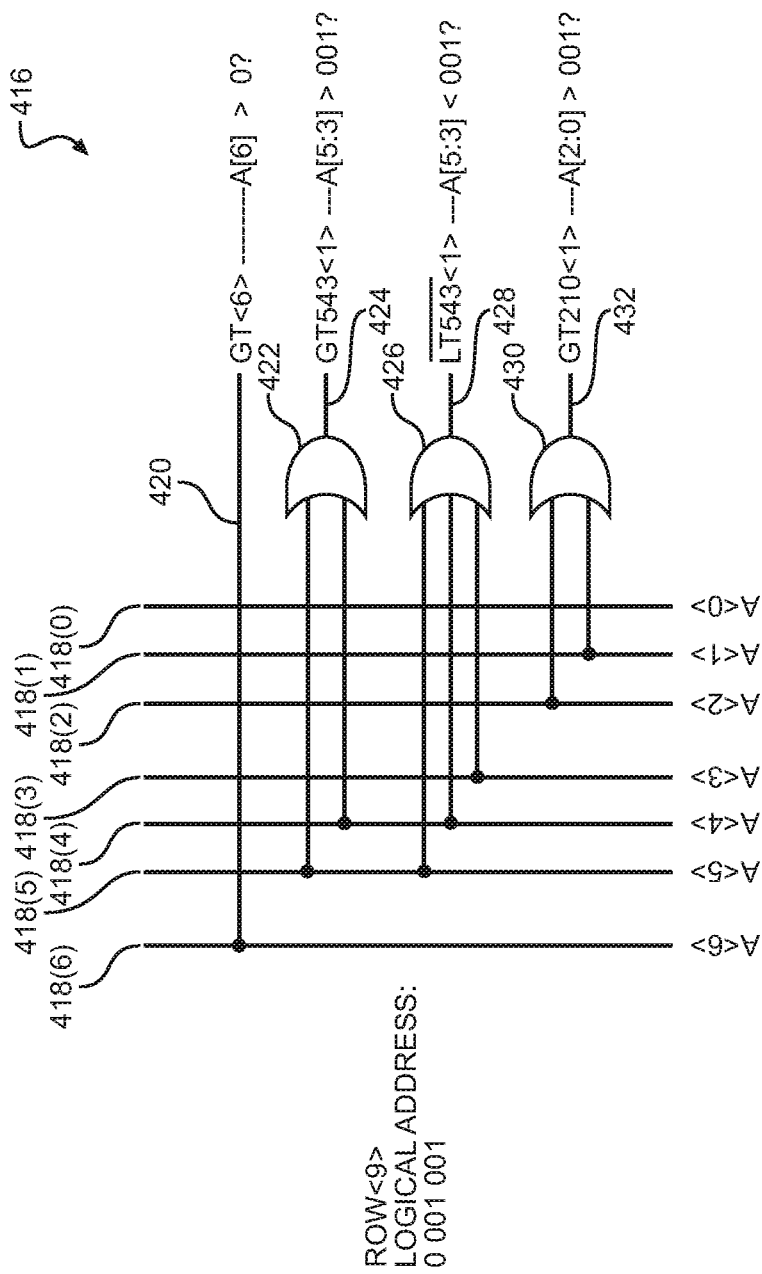

To illustrate exemplary comparison logic provided by one of the row-level compare circuits 108(0)-108(N) for generating a selection mask indicator 110(0)-110(N) for a specific one of the indexed array rows 104(0)-104(N) of FIG. 1, FIGS. 4A and 4B are provided. In particular, FIG. 4A shows a comparison logic chart 400 for the indexed array row 104(9) having a seven (7)-bit logical address 106(9) with a value of nine (9) (or 0 001 001 in binary). The comparison logic chart 400 represents pre-calculated results for comparing subsets of bits of the logical address 106(9) with all possible values of the corresponding subsets of bits of the start indicator 208. FIG. 4B shows how the comparison logic chart 400 may be implemented in one aspect of the indexed array circuit 102 of FIG. 1. It is to be understood that, while FIGS. 4A and 4B refer to indexed array row 104(9) for illustrative purposes, the principles described herein may be applied by one of skill in the art to generate analogous comparison logic for indexed array rows 104(0)-104(N) having different logical addresses 106(0)-106(N) and/or logical address lengths that are greater than or less than seven (7) bits. Note that the logic described with respect to FIGS. 4A and 4B is used to ultimately determine whether the start indicator 208 is less than or equal to the logical address 106(9) of the indexed array row 104(9). Similar logic may be applied in some aspects for determining whether the end indicator 210 is greater than the logical address 106(9).

In the comparison logic chart 400 of FIG. 4A, a leftmost column 402 shows the possible values of the subset 302(0) of the start indicator 208. Because the subset 302(0) is made up of only one (1) bit (i.e., bit six (6) of the start indicator 208), there are only two (2) possible values, one (1) and zero (0). A next column 404 shows the pre-calculated results of determining whether a comparison of the subset 302(0) of the start indicator 208 and the subset 300(0) of the logical address 106(9) indicates that the start indicator 208 is greater than (GT) the logical address 106(9). Note that bit six (6) of the logical address 106(9) has a value of zero (0). Thus, if the subset 302(0) has a value of one (1), the start indicator 208 is always larger than the logical address 106(0), and the GT result is one (1) (i.e., true), as shown in column 404. However, if the subset 302(0) has a value of zero (0), it cannot be determined definitively whether the start indicator 208 is greater than the logical address 106(0), and so the GT result in column 404 has a value of zero (0).

Similarly, column 406 of FIG. 4A shows all possible values of the subset 302(1) of the start indicator 208. The subset 302(1) includes bits five (5), four (4), and three (3) of the start indicator 208. Accordingly, there are eight (8) possible values for the subset 302(1) of the start indicator 208, ranging from a value of eight (0) to a value of zero (0). Column 408 lists the pre-calculated results of determining whether a comparison of the subset 302(1) of the start indicator 208 and the subset 300(1) of the logical address 106(9) indicates that the start indicator 208 is greater than (GT) the logical address 106(9) (assuming that the comparison of the subset 302(0) of the start indicator 208 and the subset 300(0) of the logical address 106(9) was not dispositive). The subset 300(1) of the logical address 106(9) has a binary value of 001. Consequently, for all values of the subset 302(1) of the start indicator 208 that have a value greater than 001, the GT result shown in column 408 is one (1) (i.e., true). For value 001 of the subset 302(1), it cannot be determined definitively whether the start indicator 208 is greater than the logical address 106(0), and so the GT result in column 408 for 001 has a value of zero (0). Likewise, for value 000 of the subset 302(1), the start indicator 208 is less than the logical address 106(0), and thus the GT result in column 408 for 000 has a value of zero (0).

Column 410 shows the pre-calculated results of determining whether a comparison of the subset 302(1) of the start indicator 208 and the subset 300(1) of the logical address 106(9) indicates that the start indicator 208 is not less than (LT) the logical address 106(9) (again assuming that the comparison of the subset 302(0) of the start indicator 208 and the subset 300(0) of the logical address 106(9) was not dispositive). For all values of the subset 302(1) of the start indicator 208 that have a value greater than 001, the $\overline{\text{LT}}$ result shown in column 410 is one (1) (i.e., true). For value 001 of the subset 302(1), the possibility that the start indicator 208 is not less than the logical address 106(0) still exists (depending on the value of the lower order bits). Accordingly, the $\overline{\text{LT}}$ result in column 410 for 001 has a value of one (1). For value 000 of the subset 302(1), the start indicator 208 is definitively less than the logical address 106(0), and thus the $\overline{\text{LT}}$ result in column 410 for 000 has a value of zero (0).

With continuing reference to FIG. 4A, column 412 lists all possible values of the subset 302(2) of the start indicator 208. The subset 302(2) includes the lower-order bits two (2), one (1), and zero (0) of the start indicator 208. As with the subset 302(1), there are eight (8) possible values for the subset 302(2) of the start indicator 208, ranging from a value of eight (0) to a value of zero (0). In column 414, the pre-calculated results of determining whether a comparison of the subset 302(1) of the start indicator 208 and the subset 300(1) of the logical address 106(9) indicates that the start indicator 208 is greater than (GT) the logical address 106(9) are shown (assuming that the comparisons of the subsets 302(0), 302(1) of the start indicator 208 and the subsets 300(0), 300(1) of the logical address 106(9), respectively, were not dispositive). The subset 300(1) of the logical address 106(9) has a binary value of 001. As a result, for all values of the subset 302(2) of the start indicator 208 that have a value greater than 001, the start indicator 208 is definitively greater than the logical address 106(9), and thus the GT result shown in column 414 is one (1) (i.e., true). For values 001 and 000 of the subset 302(1), the start indicator 208 is less than or equal to (LTE) the logical address 106(0), and so the GT result in column 414 for values 0001 and 000 has a value of zero (0).

As noted above, the comparison logic chart 400 of FIG. 4A is specific to the indexed array row 104(9), which has a seven (7)-bit logical address 106(9) with a value of nine (9) (or 0001001 in binary). It is to be understood that corresponding comparison logic charts for other logical addresses 106(0)-106(N), having different sizes and/or different values than those of the logical address 106(9), may be readily generated using the same principles described above with respect to FIG. 4A.

Referring now to FIG. 4B, a logical diagram 416 is provided to illustrate how the comparison logic chart 400 may be implemented in one aspect of the indexed array circuit 102 of FIG. 1. As seen in the logical diagram 416, bit values 418(0)-418(6) of the start indicator 208 ("A") are provided as input. The GT results shown in column 404 of the comparison logic chart 400 of FIG. 4A correspond to the bit value 418(6) of bit six (6) of the start indicator 208. Accordingly, the bit value 418(6) is provided as a GT indicator 420 for bit six (6) of the start indicator 208.

The GT results shown in column 408 of the comparison logic chart 400 of FIG. 4A may be generated by performing a logical OR operation on the bit value 418(5) of bit five (5) of the start indicator 208 and the bit value 418(4) of bit four (4) of the start indicator 208. Thus, as seen in FIG. 4B, the bit value 418(5) and the bit value 418(4) are provided as input into a logical OR gate 422, which outputs a GT indicator 424 for bits five (5), four (4), and three (3) of the start indicator 208. Similarly, the $\overline{\text{LT}}$ results shown in column 410 of the comparison logic chart 400 of FIG. 4A may be generated by performing a logical OR operation on the bit values 418(5), 418(4), and 418(3) of bits five (5), four (4), and three (3), respectively, of the start indicator 208. The bit values 418(5), 418(4), and 418(3) therefore are provided as input into a logical OR gate 426, which outputs an $\overline{\text{LT}}$ indicator 428 for bits five (5), four (4), and three (3) of the start indicator 208.

Finally, the GT results shown in column 414 of the comparison logic chart 400 of FIG. 4A may be generated by performing a logical OR operation on the bit value 418(2) of bit two (2) of the start indicator 208 and the bit value 418(1) of bit one (1) of the start indicator 208. Thus, as seen in FIG. 4B, the bit value 418(2) and the bit value 418(1) are provided as input into a logical OR gate 430, which outputs a GT indicator 432 for bits two (2), one (1), and zero (0) of the start indicator 208.

Figure 5A:
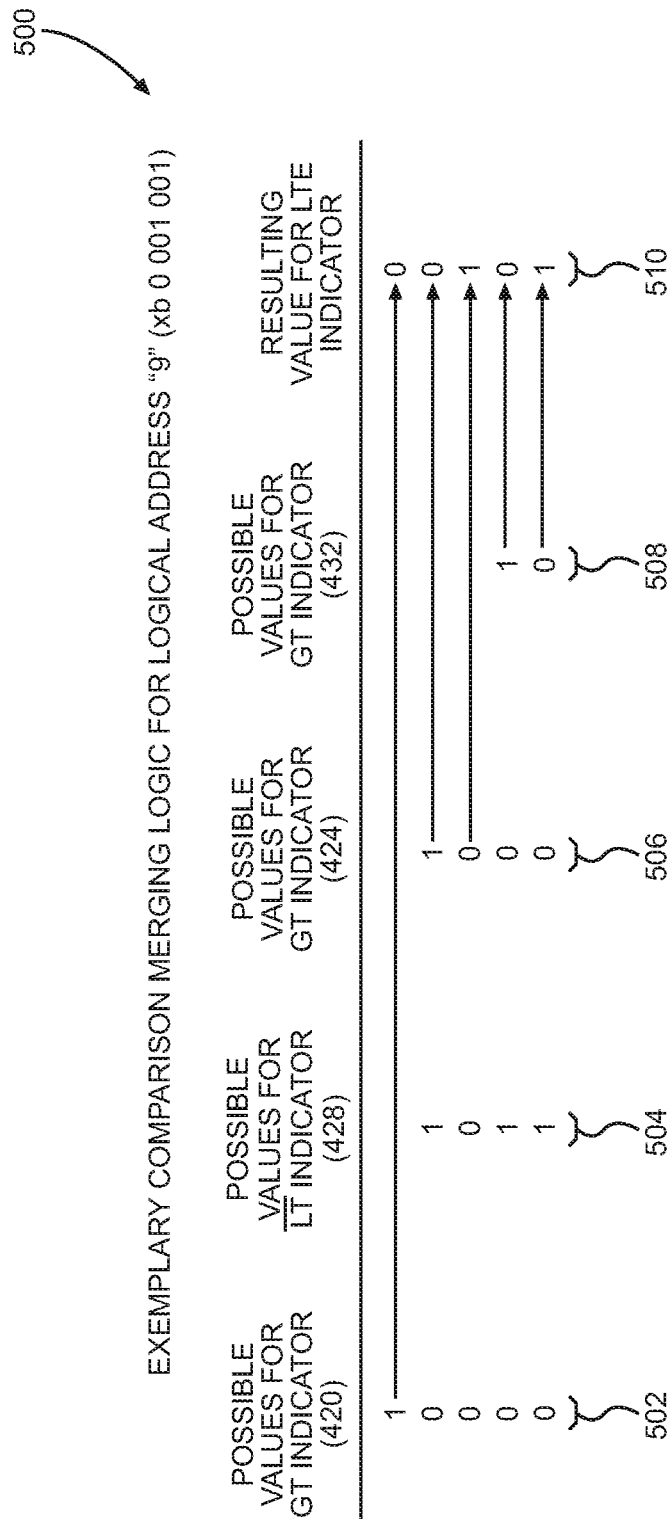

The GT indicator 420, the GT indicator 424, the $\overline{\text{LT}}$ indicator 428, and the GT indicator 432 may then be merged to make a final determination regarding whether the start indicator 208 is less than or equal to the logical address 106(9) of the indexed array row 104(9). In this regard, FIGS. 5A and 5B are provided. FIG. 5A shows a comparison merging logic chart 500 listing pre-calculated results from merging the GT indicator 420, the GT indicator 424, the $\overline{\text{LT}}$ indicator 428, and the GT indicator 432 of the logical diagram 416 of FIG. 4B. FIG. 5B illustrates how the comparison merging logic chart 500 may be implemented as a circuit in one aspect of the indexed array circuit 102 of FIG. 1.

In FIG. 5A, potential values of the GT indicator 420, the $\overline{\text{LT}}$ indicator 428, the GT indicator 424, and the GT indicator 432 of FIG. 4B are listed in columns 502, 504, 506, and 508, respectively. For each combination of values in columns 502, 504, 506, and 508, the resulting LTE indicator, indicating whether the start indicator 208 is less than or equal to the logical address 106(9), is shown in column 510. If the GT indicator 420 in column 502 has a value of one (1), the resulting LTE indicator in column 510 is zero (0), because the start indicator 208 is known to not be less than or equal to the logical address 106(9). Likewise, if the GT indicator 420 in column 502 has a value of zero (0) and both the $\overline{\text{LT}}$ indicator 428 in column 504 and the GT indicator 424 in column 506 have values of one (1), the resulting LTE indicator in column 510 is zero (0). If all three (3) of the GT indicator 420 in column 502, the $\overline{\text{LT}}$ indicator 428 in column 504, and the GT indicator 424 in column 506 have values of zero (0), the resulting LTE indicator in column 510 is one (1), because the start indicator 208 is known to be either less than or equal to the logical address 106(9).

If the $\overline{\text{LT}}$ indicator 428 in column 504 has a value of one (1) while the GT indicator 424 in column 506 has a value of zero (0), the value of the GT indicator 432 in column 508 determines the value of the resulting LTE indicator in column 510. If the GT indicator 432 in column 508 has a value of one (1) (i.e., the subset 302(2) of the start indicator 208 is greater than the subset 300(2) of the logical address 106(9)), the resulting LTE indicator value in column 510 is zero (0), indicating that the start indicator 208 is not less than or equal to the logical address 106(9). Conversely, if the GT indicator 432 in column 508 has a value of zero (0), the resulting LTE indicator value in column 510 is one (1).

A merge circuit diagram 512 of FIG. 5B illustrates an exemplary implementation of the logic shown in the comparison merging logic chart 500 of Figure 5A. In FIG. 5B, the merge circuit diagram 512 is made up of multiple p-channel field-effect transistors (PFETs) 514(0)-514(5) and n-channel field-effect transistors (NFETs) 516(0)-516(4) that are interconnected as shown. The merge circuit diagram 512 takes as input the values of the GT indicator 420, the $\overline{\text{LT}}$ indicator 428, the GT indicator 424, and the GT indicator 432 of FIG. 4B, and outputs an LTE indicator 518 for the start indicator 208. The value of the LTE indicator 518 corresponds to the values listed in column 510 of Figure 5A, and provides the final indication regarding whether the start indicator 208 is less than or equal to the logical address 106(9) (if the value of the LTE indicator 518 is one (1)) or greater than the logical address 106(9) (if the value of the LTE indicator 518 is zero (0)).

Because the most significant bit (i.e., bit six (6)) of the logical address 106(9) has a value of zero (0), and bit six (6) of the start indicator 208 can only have values of zero (0) or one (1), the single-bit comparison of bit six (6) of the logical address 106(9) with bit six (6) of the start indicator 208 can only result in values of equal (EQ) or GT. Accordingly, the corresponding leg of the merge circuit diagram 512 only requires the NFET 516(0). If the GT indicator 420 indicates that the single-bit comparison result is GT (i.e., has a value of 1), the NFET 516(0) pulls the output low, and determines the final value of the LTE indicator 518 as zero (0). However, if the single-bit comparison of bit six (6) of the logical address 106(9) with bit six (6) of the start indicator 208 is EQ, the NFET 516(0) remains off, and the next leg of the merge circuit diagram 512 is given priority by enabling the subsequent PFETs 514(0) and 514(1). Note that, in aspects having indexed array rows 104(0)-104(N) with bit six (6) having a value of one (1), a circuit similar to the merge circuit diagram 512 may be employed using only a PFET for the single-bit comparison of bit six (6) of the logical address 106(9) with bit six (6) of the start indicator 208.

To compare bits five (5), four (4), and three (3) of the start indicator 208 with those of the logical address 106(9), the merge circuit diagram 512 employs the values of both the $\overline{LT}$ indicator 428 and the GT indicator 424. If the $\overline{LT}$ indicator 428 and the GT indicator 424 both have the same value of one (1), the NFETs 516(1) and 516(3) pull their outputs low, and the PFETs 514(2) and 514(4) remain off. As a result, the final value of the LTE indicator 518 is zero (0). However, if the $\overline{LT}$ indicator 428 and the GT indicator 424 both have the same value of zero (0), the NFETs 516(1), 516(2), and 516(3) remain off and the PFETs 514(2) and 514(4) remain on, resulting in a final value of the LTE indicator 518 of one (1).

If the $\overline{LT}$ indicator 428 has a value of one (1) and the GT indicator 424 has a value of zero (0), the merge circuit diagram 512 uses the GT indicator 432 to determine a final value of the LTE indicator 518. If the GT indicator 432 has a value of one (1), the NFET 516(4) pulls its output low and the PFET 514(5) remains off, resulting in a final value of the LTE indicator 518 of zero (0). If the GT indicator 432 has a same value of zero (0), the NFET 516(4) remains off and the PFET 514(5) remains on, resulting in a final value of the LTE indicator 518 of one (1).

The parallel compare logic illustrated in FIGS. 4A and 4B and the merging logic illustrated in FIGS. 5A and 5B are applied to both the start indicator 208 and the end indicator 210 by the indexed array circuit 102 of FIG. 1. In the case of the end indicator 210, the final value of the LTE indicator 518 in some aspects may be inverted using an inverter 520 to generate a GT indicator 522, in which a value of one (1) indicates that the end indicator 210 is greater than the logical address 106(9) and a value of zero (0) indicates that the end indicator 210 is less than or equal to the logical address 106(9). These results for the start indicator 208 and the end indicator 210 are then combined with either an AND logical operation or an OR logical operation, depending on the relative values of the start indicator 208 and the end indicator 210 as shown in FIGS. 2A and 2B, to generate the selection mask indicator for the corresponding row (e.g., the selection mask indicator 110(9) for the indexed array row 104(9)).

Figure 6:
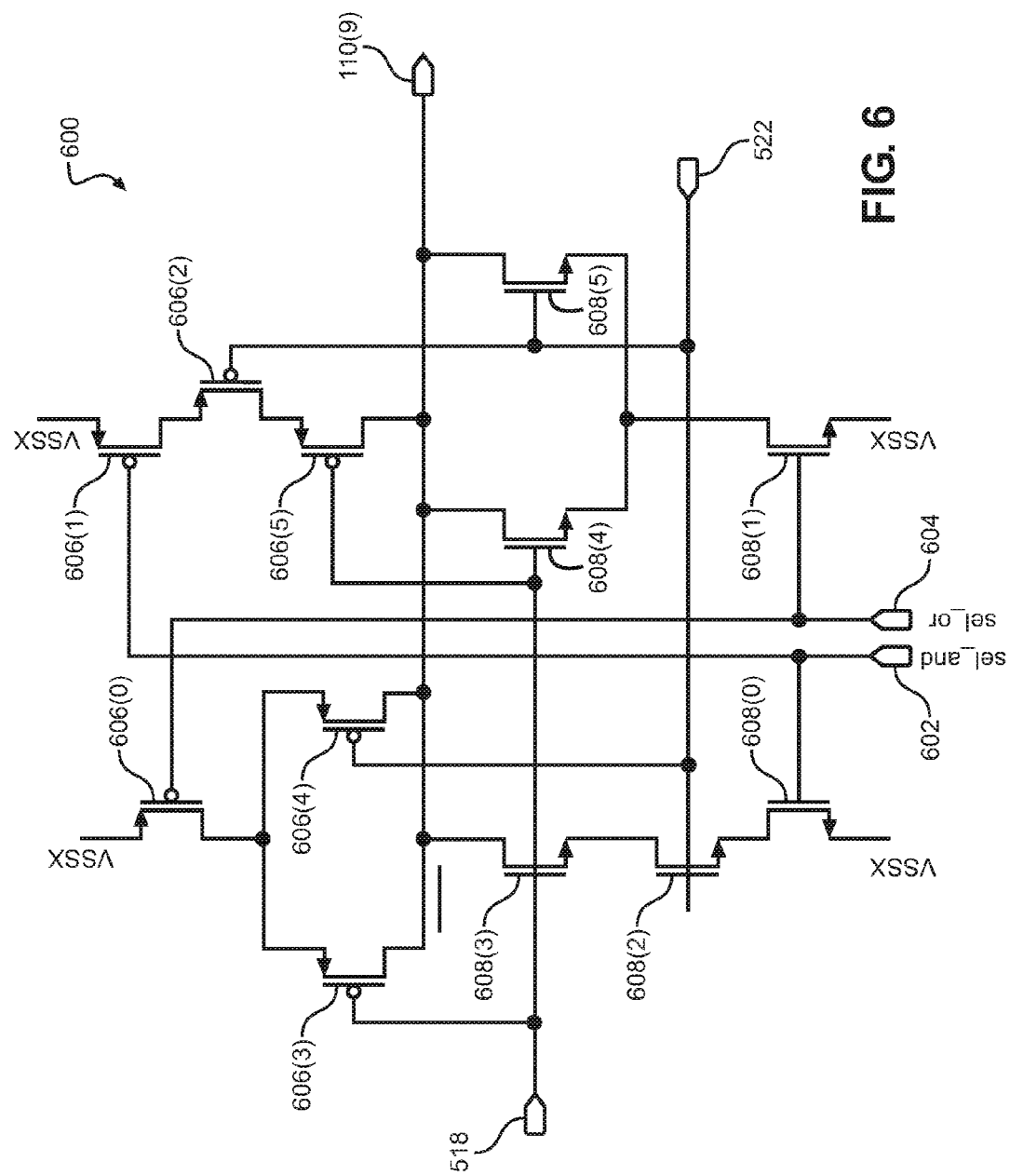
FIG. 6 is a diagram illustrating an AND/OR selection circuit providing selection logic for a two-pointer comparison and merge for a single indexed array row within the indexed array circuit of FIG. 1.

In this regard, FIG. 6 illustrates an exemplary AND/OR selection circuit 600 for a two-pointer comparison and merge logic for one of the indexed array rows 104(0)-104 (N), such as the indexed array row 104(9). In some aspects, to save chip area and minimize stage delay, the AND/OR selection circuit 600 may be implemented using an AND/OR multiplexor circuit to merge the comparison results for the start indicator 208 (e.g., the LTE indicator 518 discussed above with respect to FIG. 5B) and the end indicator 210 (e.g., the GT indicator 522 of FIG. 5B), and obtain the corresponding selection mask indicator 110(0)-110(N). It is to be understood that the exemplary AND/OR selection circuit 600 illustrated in FIG. 6 represents one possible circuit for providing AND/OR multiplexing functionality while incurring a single gate delay, and that other circuit arrangements that operate using the same input and output signaling may be provided.

In the example of FIG. 6, the AND/OR selection circuit 600 takes as input the LTE indicator 518 for the start indicator 208, which indicates whether the start indicator 208 is less than or equal to the logical address 106(9) of the indexed array row 104(9). The AND/OR selection circuit 600 also takes as input the GT indicator 522 for the end indicator 210, which indicates whether the end indicator 210 is greater than the logical address 106(9) of the indexed array row 104(9). For the LTE indicator 518, a value of zero (0) indicates that the start indicator 208 is greater than the logical address 106(9), while a value of one (1) indicates that the start indicator 208 is less than or equal to the logical address 106(9). Conversely, for the GT indicator 522, a value of zero (0) indicates that the end indicator 210 is less than or equal to the logical address 106(9), while a value of one (1) indicates that the end indicator 210 is greater than the logical address 106(9).

The AND/OR selection circuit 600 further receives an AND selection indicator 602 ("sel_and") and an OR selection indicator 604 ("sel_or") as input. In some aspects, the AND selection indicator 602 and the OR selection indicator 604 may be generated by the clock/control area 114 of the indexed array circuit 101 of FIG. 1. The AND selection indicator 602 and the OR selection indicator 604 are used to indicate to the AND/OR selection circuit 600 whether the LTE indicator 518 and the GT indicator 522 should be compared using an AND logical operation or an OR logical operation. As discussed and illustrated above in greater detail with respect to FIGS. 2A and 2B, an AND logical operation is used in a "no-wrap" scenario in which the end indicator 210 is greater than the start indicator 208, while an OR logical operation is used in a "wrap" scenario in which the end indicator 210 is not greater than the start indicator 208. The AND selection indicator 602 and the OR selection indicator 604 are the inverse of each other (i.e., when the AND selection indicator 602 has a value of one (1), the OR selection indicator 604 has a value of zero (0), and when the AND selection indicator 602 has a value of zero (0), the OR selection indicator 604 has a value of one (1)). As such, in some aspects, one of the AND selection indicator 602 and the OR selection indicator 604 may be generated by applying an inverter (not shown) to the other indicator 602, 604.

The AND/OR selection circuit 600 further includes PFETs 606(0)-606(5) and NFETs 608(0)-608(5) connected as illustrated in FIG. 6. The AND/OR selection circuit 600 is configured to use the PFETs 606(0)-606(5) and NFETs 608(0)-608(5) to generate the selection mask indicator 110

(9) as output. The selection mask indicator 110(9) generated by the AND/OR selection circuit 600 as shown is a "not selected" indicator, in that an output value of zero (0) indicates that the corresponding indexed array row 104(9) is part of the row selection bounded by the start indicator 208 and the end indicator 210. An output value of one (1) for the selection mask indicator 110(9) indicates that the indexed array row 104(9) is not part of the row selection. In some aspects, the output value may be inverted by an inverter (not shown), or the AND selection indicator 602 and the OR selection indicator 604 may be inverted, such that the selection mask indicator 110(9) is a "selected" indicator.

To optimize this physical design implementation, some aspects may provide that the parallel comparison operations discussed above with respect to FIGS. 4A and 4B are distributed to balance and optimize routing and gate area. As a non-limiting example, in one aspect, the comparison operations for bits five (5), four (4), and three (3) of the logical addresses 106(0)-106(N) with corresponding bits of the start indicator 208 and the end indicator 210 are performed locally in each indexed array row 104(0)-104(N). To avoid additional columns of gates in each indexed array row 104(0)-104(N), the comparison operations for bits two (2), one (1), and zero (0) of the logical addresses 106(0)-106(N) with corresponding bits of the start indicator 208 and the end indicator 210 are performed in the clock/control area 114 of the indexed array circuit 102 of FIG. 1. Subsequently, eight (8) resulting pre-decoded signals for each of the start indicator 208 and the end indicator 210 are routed globally across all of the indexed array rows 104(0)-104(N) in existing routing porosity. The comparison operations for bit six (6) of the logical addresses 106(0)-106(N) with the corresponding bit of the start indicator 208 and the end indicator 210 are merged into the circuit(s) that implement the parallel comparison logic of FIGS. 4A and 4B.

Some aspects of the row-level compare circuits 108(0)-108(N) may be optimized such that as the stage depth (from receiving the start indicator 208 and the end indicator 210 to generating the final selection mask indicators 110(0)-110(N)) is merely three (3) gate delays. At stage one (1), the parallel comparison operations described above with respect to FIGS. 4A and 4B are performed, requiring one (1) stage delay. The results of the parallel comparison operations are merged in stage two (2), as discussed above with respect to FIGS. 5A and 5B. Finally, in stage three (3), the AND/OR selection circuit 600 of FIG. 6 handles the "wrap"/"no wrap" selection logic.

To illustrate exemplary operations for efficiently generating selection masks for row selections by the indexed array circuit 102 of FIG. 1, FIGS. 7A-7C are provided. For the sake of clarity, elements of FIGS. 1, 2A, 2B, 3A, and 3B are referenced in describing FIGS. 7A-7C. Operations in FIG. 7A begin with the indexed array circuit 102 of FIG. 1 performing a series of operations for each indexed array row 104(0) of the plurality of indexed array rows 104(0)-104(N) ordered in a logical sequence (block 700). In particular, the row-level compare circuit 108(0) of the indexed array circuit 102 performs a first plurality of parallel comparisons of a plurality of subsets 300(0)-300(2) of bits of a logical address 106(0) of the indexed array row 104(0) with a corresponding plurality of subsets 302(0)-302(2) of bits of the start indicator 208 that indicate a start indexed array row 104(0) of a row selection 204, 206 within the plurality of indexed array rows 104(0)-104(N) (block 702). In this regard, the row-level compare circuit 108(0) may be referred to herein as "a means for performing, for each indexed array row of a plurality of indexed array rows ordered in a logical sequence, a first plurality of parallel comparisons of a plurality of subsets of bits of a logical address of the indexed array row with a corresponding plurality of subsets of bits of a start indicator that indicates a start indexed array row of a row selection within the plurality of indexed array rows."

In some aspects, operations of block 702 for performing the first plurality of parallel comparisons include the row-level compare circuit 108(0) comparing bit six (6) of the logical address 106(0) of the indexed array row 104(0) with bit six (6) of the start indicator 208 (block 704). The row-level compare circuit 108(0) may thus be referred to herein as "a means for comparing bit six (6) of the logical address of the indexed array row with bit six (6) of the start indicator." The row-level compare circuit 108(0) also may compare bits five (5), four (4), and three (3) of the logical address 106(0) of the indexed array row 104(0) with bits five (5), four (4), and three (3) of the start indicator 208 (block 706). In this regard, the row-level compare circuit 108(0) may be referred to herein as "a means for comparing bits five (5), four (4), and three (3) of the logical address of the indexed array row with bits five (5), four (4), and three (3) of the start indicator." The row-level compare circuit 108(0) additionally may compare bits two (2), one (1), and zero (0) of the logical address 106(0) of the indexed array row 104(0) with bits (2), one (1), and zero (0) of the start indicator 208 (block 708). Accordingly, the row-level compare circuit 108(0) may be referred to herein as "a means for comparing bits two (2), one (1), and zero (0) of the logical address of the indexed array row with bits two (2), one (1), and zero (0) of the start indicator." Processing then resumes at block 710 of FIG. 7B. It is to be understood that, in some aspects, the operations of blocks 704, 706, and 708 may be performed in an order other than that illustrated in FIG. 7A, and/or may be performed in parallel.

Figure 7A:
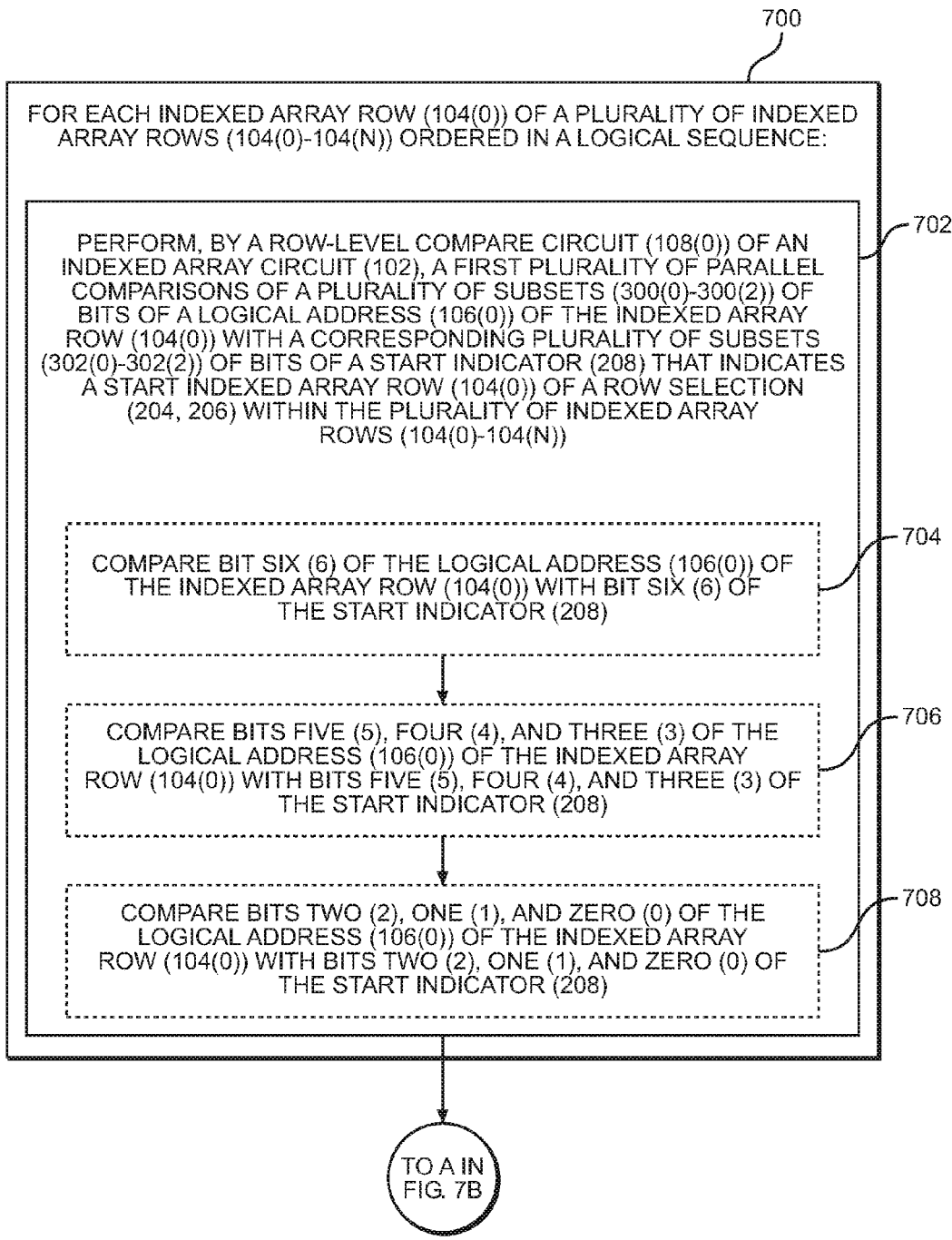
FIGS. 7A-7C are flowcharts illustrating exemplary operations for efficiently generating selection masks for row selections by the indexed array circuit of FIG. 1.
Figure 7B:
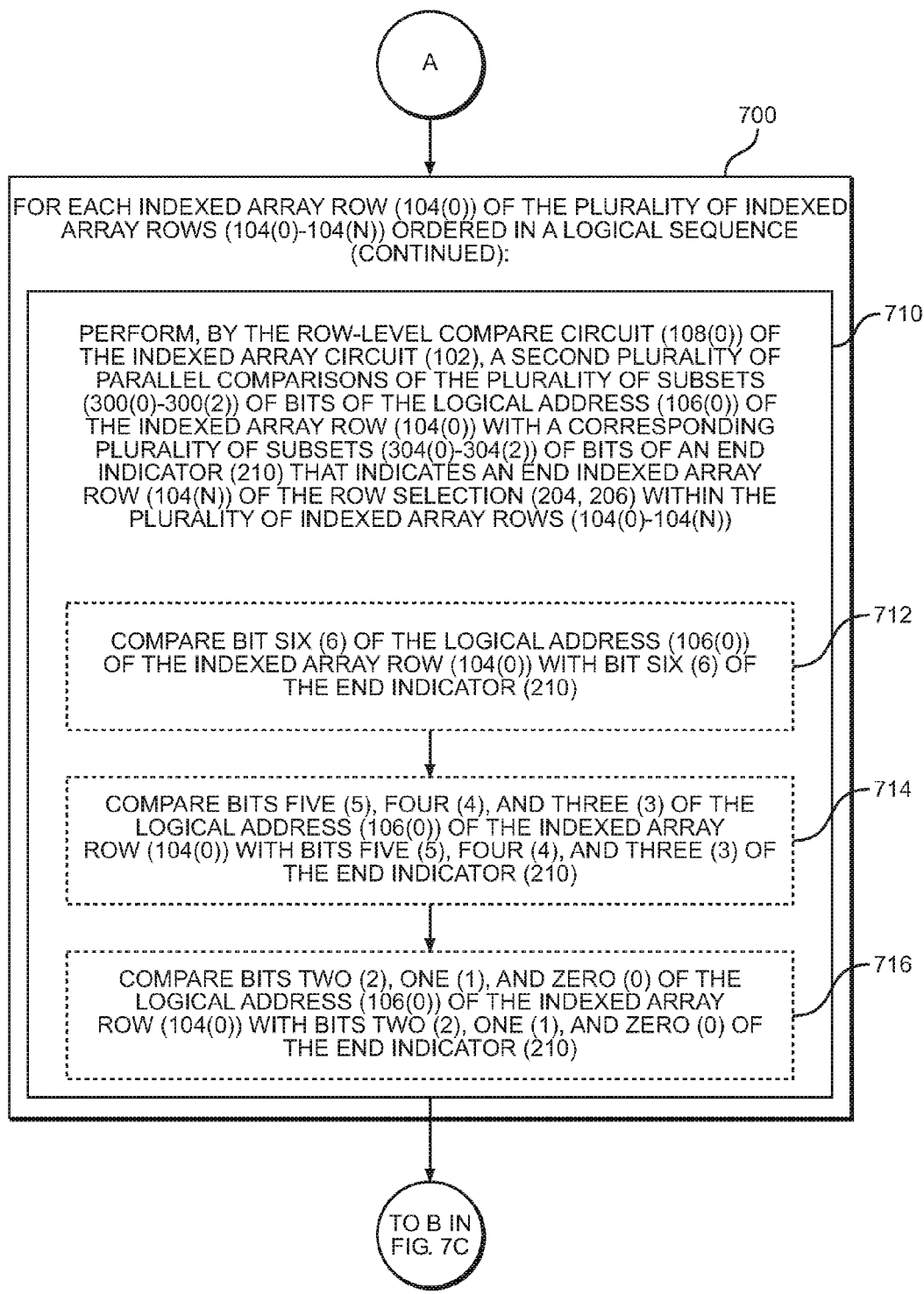

Referring now to FIG. 7B, the indexed array circuit 102 continues performing operations for each indexed array row 104(0) of the plurality of indexed array rows 104(0)-104(N) ordered in the logical sequence (block 700). The row-level compare circuit 108(0) of the indexed array circuit 102 performs a second plurality of parallel comparisons of the plurality of subsets 300(0)-300(2) of bits of the logical address 106(0) of the indexed array row 104(0) with a corresponding plurality of subsets 304(0)-304(2) of bits of the end indicator 210 that indicates an end indexed array row 104(N) of the row selection 204, 206 within the plurality of indexed array rows 104(0)-104(N) (block 710). Accordingly, the row-level compare circuit 108(0) may be referred to herein as "a means for performing, for each indexed array row of the plurality of indexed array rows ordered in the logical sequence, a second plurality of parallel comparisons of the plurality of subsets of bits of the logical address of the indexed array row with a corresponding plurality of subsets of bits of an end indicator that indicates an end indexed array row of the row selection within the plurality of indexed array rows." In some aspects, the operations of block 702 of FIG. 7A and block 710 of FIG. 7B may be performed in an order other than that illustrated in FIGS. 7A and 7B, and/or may be performed in parallel with one another.

Some aspects of the indexed array circuit 102 may provide that operations of block 710 for performing the second plurality of parallel comparisons include the row-level compare circuit 108(0) comparing bit six (6) of the logical address 106(0) of the indexed array row 104(0) with bit six (6) of the end indicator 210 (block 712). The row-level compare circuit 108(0) may thus be referred to herein as "a means for comparing bit six (6) of the logical address of the indexed array row with bit six (6) of the end indicator." The row-level compare circuit 108(0) may also compare bits five (5), four (4), and three (3) of the logical address 106(0) of the indexed array row 104(0) with bits five (5), four (4), and three (3) of the end indicator 210 (block 714). In this regard, the row-level compare circuit 108(0) may be referred to herein as "a means for comparing bits five (5), four (4), and three (3) of the logical address of the indexed array row with bits five (5), four (4), and three (3) of the end indicator." The row-level compare circuit 108(0) may additionally compare bits two (2), one (1), and zero (0) of the logical address 106(0) of the indexed array row 104(0) with bits two (2), one (1), and zero (0) of the end indicator 210 (block 716). Accordingly, the row-level compare circuit 108(0) may be referred to herein as "a means for comparing bits two (2), one (1), and zero (0) of the logical address of the indexed array row with bits two (2), one (1), and zero (0) of the end indicator." According to some aspects, the operations of blocks 712, 714, and 716 may be performed in an order other than that illustrated in FIG. 7B, and/or may be performed in parallel. Processing then continues at block 718 of FIG. 7C.

Figure 7C:
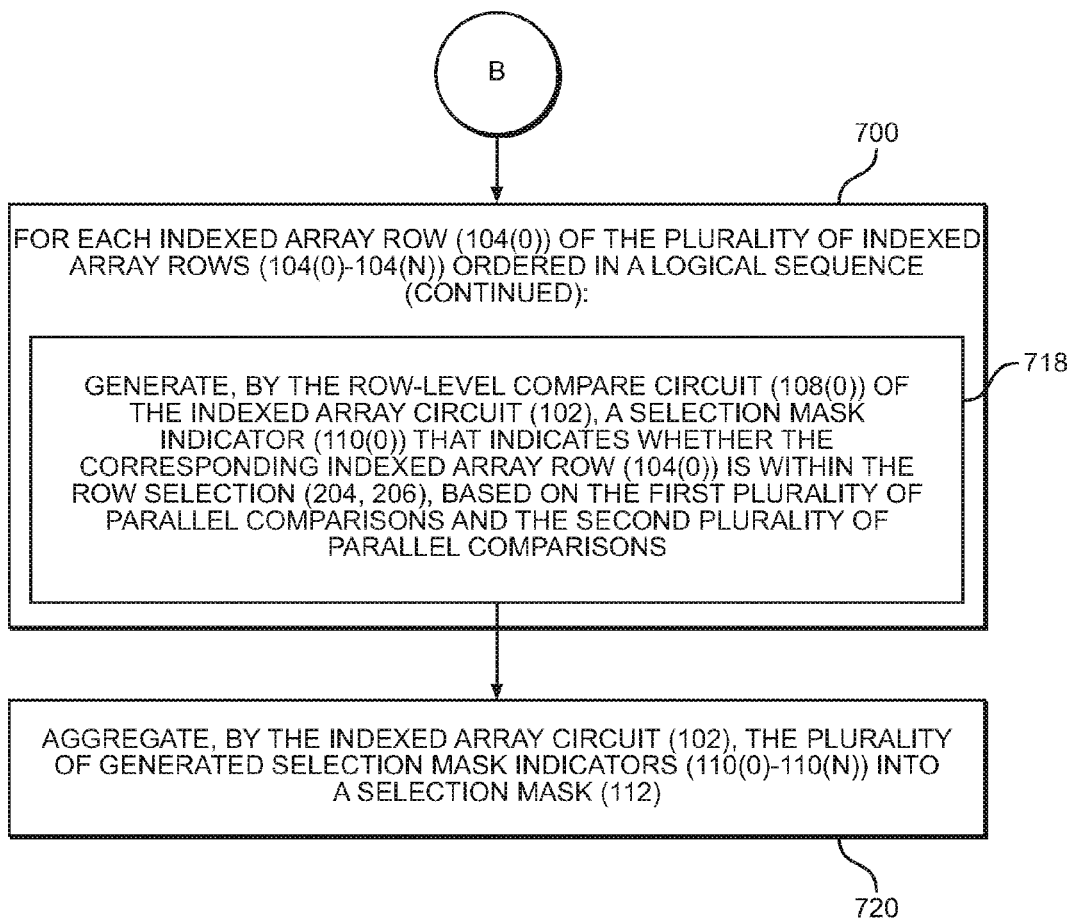

Turning now to FIG. 7C, the indexed array circuit 102 performs further operations for each indexed array row 104(0) of the plurality of indexed array rows 104(0)-104(N) ordered in the logical sequence (block 700). The row-level compare circuit 108(0) generates the selection mask indicator 110(0) that indicates whether the corresponding indexed array row 104(0) is within the row selection 204, 206, based on the first plurality of parallel comparisons and the second plurality of parallel comparisons (block 718). The row-level compare circuit 108(0) thus may be referred to herein as "a means for generating, for each indexed array row of the plurality of indexed array rows ordered in the logical sequence, a selection mask indicator that indicates whether the indexed array row is within the row selection, based on the first plurality of parallel comparisons and the second plurality of parallel comparisons." The indexed array circuit 102 then aggregates the plurality of generated selection mask indicators 110(0)-110(N) into a selection mask 112 (block 720). In this regard, the indexed array circuit 102 may be referred to herein as "a means for aggregating the plurality of generated selection mask indicators into a selection mask."

Figure 8:
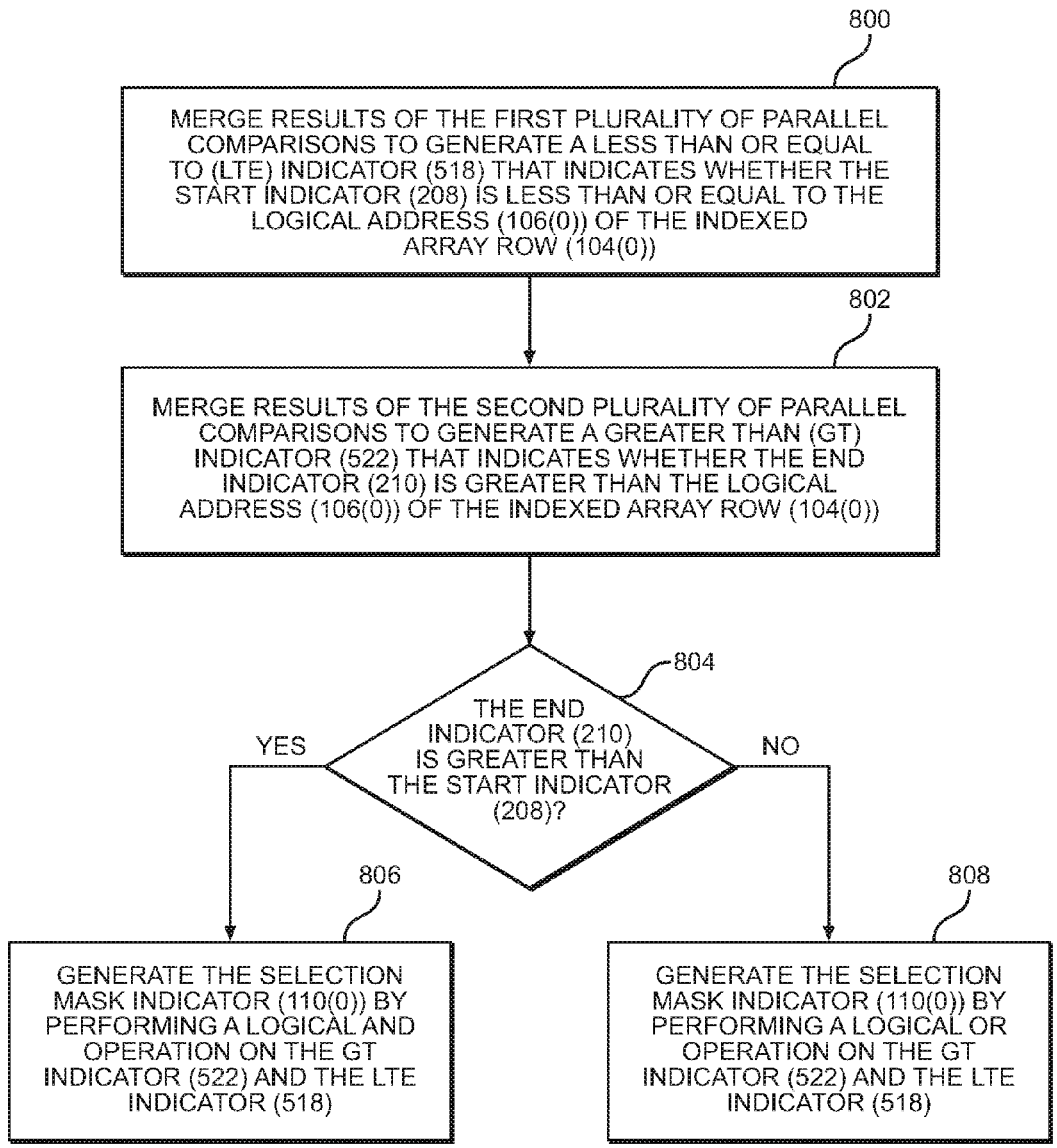
FIG. 8 is a flowchart illustrating exemplary operations for generating a selection mask indicator by a row-level compare circuit of the indexed array circuit of FIG. 1.

FIG. 8 illustrates further exemplary operations for generating the selection mask indicator 110(0) by each of the row-level compare circuits 108(0)-108(N) of the indexed array circuit 102 of FIG. 1. Elements of FIGS. 1, 2A, 2B, and 5B are referenced in describing FIG. 8 for the sake of clarity. It is to be understood that the operations illustrated in FIG. 8 may correspond to the operations in block 718 of FIG. 7C for generating the selection mask indicator 110(0).

In FIG. 8, operations begin with the row-level compare circuit 108(0) of the indexed array circuit 102 merging results of the first plurality of parallel comparisons to generate a less than or equal to (LTE) indicator 518 that indicates whether the start indicator 208 is less than or equal to the logical address 106(0) of the indexed array row 104(0) (block 800). Accordingly, the row-level compare circuit 108(0) may be referred to herein as "a means for merging results of the first plurality of parallel comparisons to generate a less than or equal to (LTE) indicator that indicates whether the start indicator is less than or equal to the logical address of the indexed array row." The row-level compare circuit 108(0) also merges results of the second plurality of parallel comparisons to generate a greater than (GT) indicator 522 that indicates whether the end indicator 210 is greater than the logical address 106(0) of the indexed array row 104(0) (block 802). The row-level compare circuit 108(0) thus may be referred to herein as "a means for merging results of the second plurality of parallel comparisons to generate a greater than (GT) indicator that indicates whether the end indicator is greater than the logical address of the indexed array row."

Next, a determination is made regarding whether the end indicator 210 is greater than the start indicator 208 (block 804). In some aspects, this determination may be made by logic provided by the clock/control area 114 of the indexed array circuit 102 of FIG. 1, and may be communicated to the row-level compare circuits 108(0)-108(N) as the AND selection indicator 602 and the OR selection indicator 604 of FIG. 6. In this regard, the clock/control area 114 may be referred to herein as "a means for determining whether the end indicator is greater than the start indicator." If the end indicator 210 is determined at decision block 804 to be larger than the start indicator 208 (i.e., the "no-wrap" scenario), the row-level compare circuit 108(0) generates the selection mask indicator 110(0) by performing a logical AND operation on the GT indicator 522 and the LTE indicator 518 (block 806). Accordingly, the row-level compare circuit 108(0) may be referred to herein as "a means for generating the selection mask indicator by performing a logical AND operation on the GT indicator and the LTE indicator, responsive to determining that the end indicator is greater than the start indicator." However, if the row-level compare circuit 108(0) determines at decision block 804 that the end indicator 210 is not larger than the start indicator 208, the row-level compare circuit 108(0) generates the selection mask indicator 110(0) by performing a logical OR operation on the GT indicator 522 and the LTE indicator 518 (block 808). The row-level compare circuit 108(0) thus may be referred to herein as "a means for generating the selection mask indicator by performing a logical OR operation on the GT indicator and the LTE indicator, responsive to determining that the end indicator is not greater than the start indicator."

Efficiently generating selection masks for row selections within indexed address spaces according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a phablet, a server, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 9:
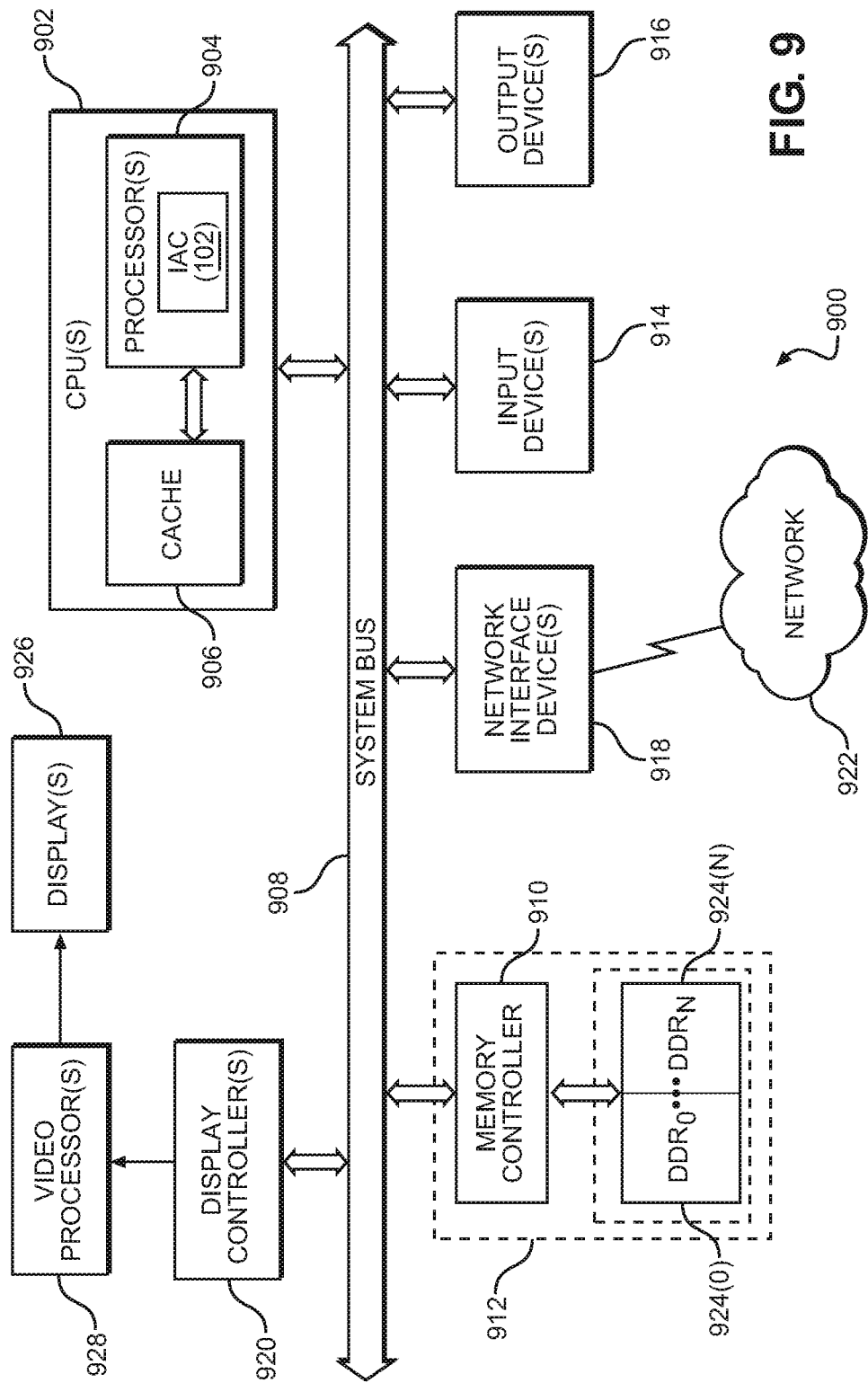
FIG. 9 is a block diagram of an exemplary processor-based system that can include the indexed array circuit of FIG. 1.

In this regard, FIG. 9 illustrates an example of a processor-based system 900 that can employ the indexed array circuit 102 illustrated in FIG. 1. In this example, the processor-based system 900 includes one or more central processing units (CPUs) 902, each including one or more processors 904. The one or more processors 904 may correspond to the computer-processor-based system 100 of FIG. 1, and may provide the indexed array circuit (IAC) 102 of FIG. 1. The CPU(s) 902 may be a master device. The CPU(s) 902 may have cache memory 906 coupled to the processor(s) 904 for rapid access to temporarily stored data. The CPU(s) 902 is coupled to a system bus 908 and can intercouple master and slave devices included in the processor-based system 900. As is well known, the CPU(s) 902 communicates with these other devices by exchanging address, control, and data information over the system bus 908. For example, the CPU(s) 902 can communicate bus transaction requests to a memory controller 910 as an example of a slave device.

Other master and slave devices can be connected to the system bus 908. As illustrated in FIG. 9, these devices can include a memory system 912, one or more input devices 914, one or more output devices 916, one or more network interface devices 918, and one or more display controllers 920, as examples. The input device(s) 914 can include any type of input device, including but not limited to input keys, switches, voice processors, etc. The output device(s) 916 can include any type of output device, including, but not limited to, audio, video, other visual indicators, etc. The network interface device(s) 918 can be any devices configured to allow exchange of data to and from a network 922. The network 922 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 918 can be configured to support any type of communications protocol desired. The memory system 912 can include one or more memory units 924(0)-924(N).

The CPU(s) 902 may also be configured to access the display controller(s) 920 over the system bus 908 to control information sent to one or more displays 926. The display controller(s) 920 sends information to the display(s) 926 to be displayed via one or more video processors 928, which process the information to be displayed into a format suitable for the display(s) 926. The display(s) 926 can include any type of display, including, but not limited to, a cathode ray tube (CRT), a liquid crystal display (LCD), a plasma display, etc.

Those of skill in the art will further appreciate that the master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An indexed array circuit for efficiently generating selection masks for row selections within an indexed address space, comprising:
    a plurality of indexed array rows, the plurality of indexed array rows ordered in a logical sequence, each indexed array row of the plurality of indexed array rows comprising a logical address and a row-level compare circuit;
    a start indicator that indicates a start indexed array row of a row selection within the plurality of indexed array rows;
    an end indicator that indicates an end indexed array row of the row selection within the plurality of indexed array rows;
    each of the row-level compare circuits of the plurality of indexed array rows configured to:
        perform a first plurality of parallel comparisons of a plurality of subsets of bits of the logical address of the indexed array row with a corresponding plurality of subsets of bits of the start indicator;
        perform a second plurality of parallel comparisons of the plurality of subsets of bits of the logical address of the indexed array row with a corresponding plurality of subsets of bits of the end indicator; and
        generate a selection mask indicator that indicates whether the corresponding indexed array row is within the row selection, based on the first plurality of parallel comparisons and the second plurality of parallel comparisons; and
    the indexed array circuit configured to aggregate the plurality of generated selection mask indicators into a selection mask.

2. The indexed array circuit of claim 1, wherein each of the row-level compare circuits is further configured to generate the selection mask indicator by being configured to:

merge results of the first plurality of parallel comparisons to generate a less than or equal to (LTE) indicator that indicates whether the start indicator is less than or equal to the logical address of the indexed array row; and merge results of the second plurality of parallel comparisons to generate a greater than (GT) indicator that indicates whether the end indicator is greater than the logical address of the indexed array row.

3. The indexed array circuit of claim 2, further configured to determine whether the end indicator is greater than the start indicator;

wherein each of the row-level compare circuits is further configured to generate the selection mask indicator by being configured to:

responsive to the indexed array circuit determining that the end indicator is greater than the start indicator, generate the selection mask indicator by performing a logical AND operation on the GT indicator and the LTE indicator; and responsive to the indexed array circuit determining that the end indicator is not greater than the start indicator, generate the selection mask indicator by performing a logical OR operation on the GT indicator and the LTE indicator.

4. The indexed array circuit of claim 3, wherein each of the row-level compare circuits comprises an AND/OR multiplexor circuit configured to generate the selection mask indicator.

5. The indexed array circuit of claim 1, wherein:

each of the start indicator, the end indicator, and the logical address of the indexed array row are seven (7) bits in size; and each of the row-level compare circuits is configured to:
perform the first plurality of parallel comparisons by:
comparing bit six (6) of the logical address of the indexed array row with bit six (6) of the start indicator;
comparing bits five (5), four (4), and three (3) of the logical address of the indexed array row with bits five (5), four (4), and three (3) of the start indicator; and
comparing bits two (2), one (1), and zero (0) of the logical address of the indexed array row with bits two (2), one (1), and zero (0) of the start indicator; and perform the second plurality of parallel comparisons by:
comparing bit six (6) of the logical address of the indexed array row with bit six (6) of the end indicator;
comparing bits five (5), four (4), and three (3) of the logical address of the indexed array row with bits five (5), four (4), and three (3) of the end indicator; and
comparing bits two (2), one (1), and zero (0) of the logical address of the indexed array row with bits two (2), one (1), and zero (0) of the end indicator.

6. The indexed array circuit of claim 1, further comprising a clock/control area;

wherein the first plurality of parallel comparisons and the second plurality of parallel comparisons are distributed between the row-level compare circuit and the clock/control area of the indexed array circuit.

7. The indexed array circuit of claim 1 integrated into an integrated circuit (IC).

8. The indexed array circuit of claim 1 integrated into a device selected from the group consisting of: a set top box; an entertainment unit; a navigation device; a communications device; a fixed location data unit; a mobile location data unit; a mobile phone; a cellular phone; a smart phone; a tablet; a phablet; a server; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

9. An indexed array circuit for efficiently generating selection masks for row selections within an indexed address space, comprising:

a means for performing, for each indexed array row of a plurality of indexed array rows ordered in a logical sequence, a first plurality of parallel comparisons of a plurality of subsets of bits of a logical address of the indexed array row with a corresponding plurality of subsets of bits of a start indicator that indicates a start indexed array row of a row selection within the plurality of indexed array rows;

a means for performing, for each indexed array row of the plurality of indexed array rows ordered in the logical sequence, a second plurality of parallel comparisons of the plurality of subsets of bits of the logical address of the indexed array row with a corresponding plurality of subsets of bits of an end indicator that indicates an end indexed array row of the row selection within the plurality of indexed array rows;

a means for generating, for each indexed array row of the plurality of indexed array rows ordered in the logical sequence, a selection mask indicator that indicates whether the indexed array row is within the row selection, based on the first plurality of parallel comparisons and the second plurality of parallel comparisons; and a means for aggregating the plurality of generated selection mask indicators into a selection mask.

10. The indexed array circuit of claim 9, wherein the means for generating the selection mask indicator further comprises:

a means for merging results of the first plurality of parallel comparisons to generate a less than or equal to (LTE) indicator that indicates whether the start indicator is less than or equal to the logical address of the indexed array row; and a means for merging results of the second plurality of parallel comparisons to generate a greater than (GT) indicator that indicates whether the end indicator is greater than the logical address of the indexed array row.

11. The indexed array circuit of claim 10, wherein the means for generating the selection mask indicator further comprises:

a means for determining whether the end indicator is greater than the start indicator;

a means for generating the selection mask indicator by performing a logical AND operation on the GT indicator and the LTE indicator, responsive to determining that the end indicator is greater than the start indicator; and a means for generating the selection mask indicator by performing a logical OR operation on the GT indicator and the LTE indicator, responsive to determining that the end indicator is not greater than the start indicator.

12. The indexed array circuit of claim 11, wherein the means for generating the selection mask indicator comprises an AND/OR multiplexor circuit.

13. The indexed array circuit of claim 9, wherein:
each of the start indicator, the end indicator, and the logical address of the indexed array row are seven (7) bits in size;
the means for performing the first plurality of parallel comparisons comprises:
a means for comparing bit six (6) of the logical address of the indexed array row with bit six (6) of the start indicator;
a means for comparing bits five (5), four (4), and three (3) of the logical address of the indexed array row with bits five (5), four (4), and three (3) of the start indicator; and
a means for comparing bits two (2), one (1), and zero (0) of the logical address of the indexed array row with bits two (2), one (1), and zero (0) of the start indicator; and
the means for performing the second plurality of parallel comparisons comprises:
a means for comparing bit six (6) of the logical address of the indexed array row with bit six (6) of the end indicator;
a means for comparing bits five (5), four (4), and three (3) of the logical address of the indexed array row with bits five (5), four (4), and three (3) of the end indicator; and
a means for comparing bits two (2), one (1), and zero (0) of the logical address of the indexed array row with bits two (2), one (1), and zero (0) of the end indicator.

14. The indexed array circuit of claim 9, wherein the first plurality of parallel comparisons and the second plurality of parallel comparisons are distributed between the row-level compare circuit and a clock/control area of the indexed array circuit.

15. A method for efficiently generating selection masks for row selections within an indexed address space, comprising:
for each indexed array row of a plurality of indexed array rows ordered in a logical sequence:
performing, by a row-level compare circuit of an indexed array circuit, a first plurality of parallel comparisons of a plurality of subsets of bits of a logical address of the indexed array row with a corresponding plurality of subsets of bits of a start indicator that indicates a start indexed array row of a row selection within the plurality of indexed array rows;
performing, by the row-level compare circuit of the indexed array circuit, a second plurality of parallel comparisons of the plurality of subsets of bits of the logical address of the indexed array row with a corresponding plurality of subsets of bits of an end indicator that indicates an end indexed array row of the row selection within the plurality of indexed array rows; and
generating, by the row-level compare circuit of the indexed array circuit, a selection mask indicator that indicates whether the corresponding indexed array row is within the row selection, based on the first plurality of parallel comparisons and the second plurality of parallel comparisons; and aggregating, by the indexed array circuit, the plurality of generated selection mask indicators into a selection mask.

16. The method of claim 15, wherein generating the selection mask indicator further comprises:
merging results of the first plurality of parallel comparisons to generate a less than or equal to (LTE) indicator that indicates whether the start indicator is less than or equal to the logical address of the indexed array row; and
merging results of the second plurality of parallel comparisons to generate a greater than (GT) indicator that indicates whether the end indicator is greater than the logical address of the indexed array row.

17. The method of claim 16, wherein generating the selection mask indicator further comprises:
determining whether the end indicator is greater than the start indicator;
responsive to determining that the end indicator is greater than the start indicator, generating the selection mask indicator by performing a logical AND operation on the GT indicator and the LTE indicator; and
responsive to determining that the end indicator is not greater than the start indicator, generating the selection mask indicator by performing a logical OR operation on the GT indicator and the LTE indicator.

18. The method of claim 17, wherein generating the selection mask indicator is performed by an AND/OR multiplexor circuit of the row-level compare circuit.

19. The method of claim 15, wherein:
each of the start indicator, the end indicator, and the logical address of the indexed array row are seven (7) bits in size;
performing the first plurality of parallel comparisons comprises:
comparing bit six (6) of the logical address of the indexed array row with bit six (6) of the start indicator;
comparing bits five (5), four (4), and three (3) of the logical address of the indexed array row with bits five (5), four (4), and three (3) of the start indicator; and
comparing bits two (2), one (1), and zero (0) of the logical address of the indexed array row with bits two (2), one (1), and zero (0) of the start indicator; and
performing the second plurality of parallel comparisons comprises:
comparing bit six (6) of the logical address of the indexed array row with bit six (6) of the end indicator;
comparing bits five (5), four (4), and three (3) of the logical address of the indexed array row with bits five (5), four (4), and three (3) of the end indicator; and
comparing bits two (2), one (1), and zero (0) of the logical address of the indexed array row with bits two (2), one (1), and zero (0) of the end indicator.

20. The method of claim 15, wherein the first plurality of parallel comparisons and the second plurality of parallel comparisons are distributed between the row-level compare circuit and a clock/control area of the indexed array circuit.

* * * * *